(12) United States Patent
Nakamura et al.

(10) Patent No.: US 11,774,649 B2
(45) Date of Patent: Oct. 3, 2023

(54) OPTICAL ELEMENT AND OPTICAL APPARATUS

(71) Applicant: HOYA CORPORATION, Tokyo (JP)

(72) Inventors: Toshiki Nakamura, Tokyo (JP);
Yutaka Takakubo, Tokyo (JP);
Yoshitake Tanno, Tokyo (JP); Yasushi Tsutsumi, Tokyo (JP); Naomi Matsumoto, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 68 days.

(21) Appl. No.: 17/237,617

(22) Filed: Apr. 22, 2021

(65) Prior Publication Data
US 2021/0333449 A1   Oct. 28, 2021

(30) Foreign Application Priority Data
Apr. 24, 2020   (JP) ................. 2020-077812

(51) Int. Cl.
*G02B 5/18* (2006.01)
(52) U.S. Cl.
CPC .... *G02B 5/1814* (2013.01); *G02B 2005/1804* (2013.01)

(58) Field of Classification Search
CPC .......... G02B 5/1814; G02B 2005/1804; G02B 5/1866; G02B 5/1876
See application file for complete search history.

(56) References Cited

U.S. PATENT DOCUMENTS

| 2012/0075727 | A1 | 3/2012 | Takakubo et al. |
| 2019/0339485 | A1 | 11/2019 | Nakaniura et al. |
| 2021/0048665 | A1* | 2/2021 | Nakamura ......... G02B 27/0018 |

FOREIGN PATENT DOCUMENTS

| JP | 2002201041 A | * | 7/2002 | .......... C03B 11/005 |
| JP | 2012-168375 A | | 9/2012 | |
| JP | 2018-197743 A | | 12/2018 | |
| WO | 2017/149687 A1 | | 9/2017 | |
| WO | WO-2020230649 A1 | * | 11/2020 | |

* cited by examiner

*Primary Examiner* — Kimberly N. Kakalec
(74) *Attorney, Agent, or Firm* — GREENBLUM & BERNSTEIN, P.L.C.

(57) ABSTRACT

An optical element includes a glass body including a colored layer provided inside the glass body and positioned at an optical function surface of the optical element. An optical apparatus including the optical element is also provided.

8 Claims, 19 Drawing Sheets

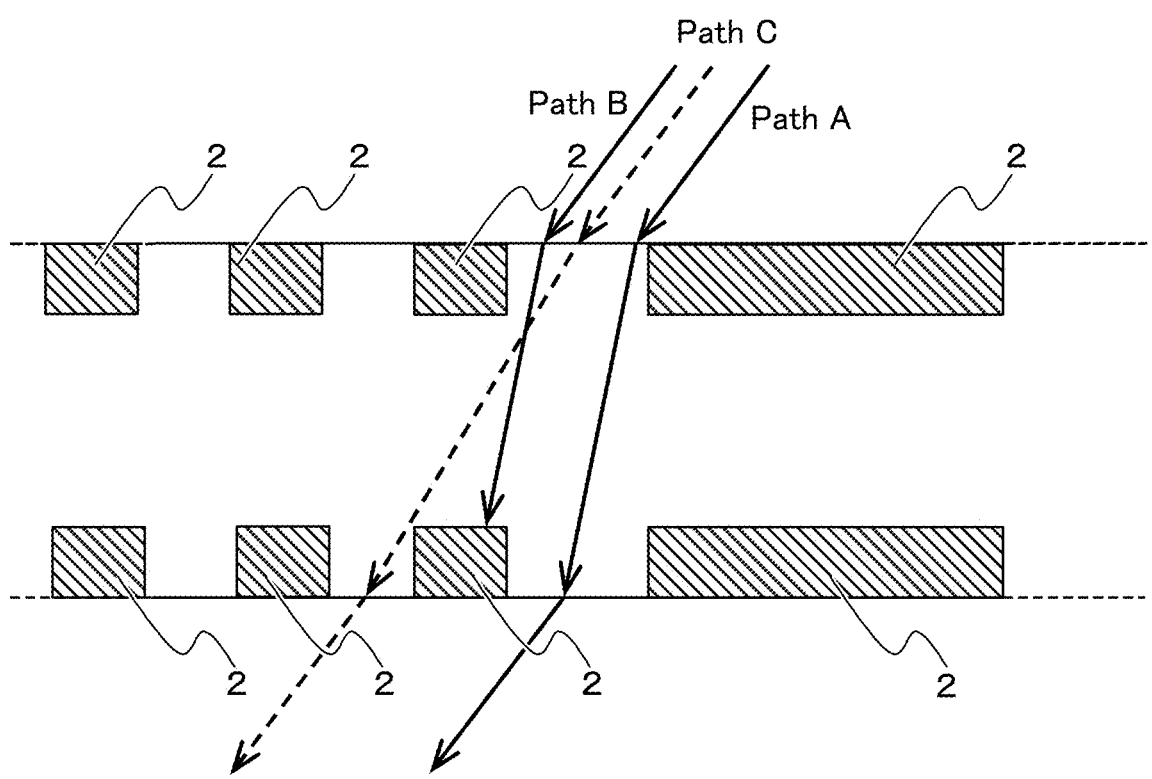

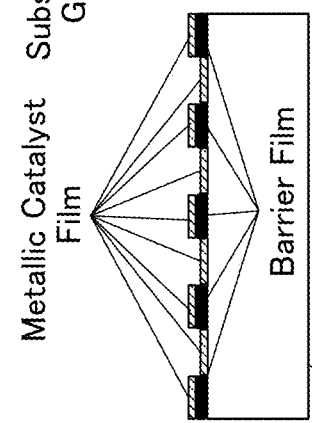
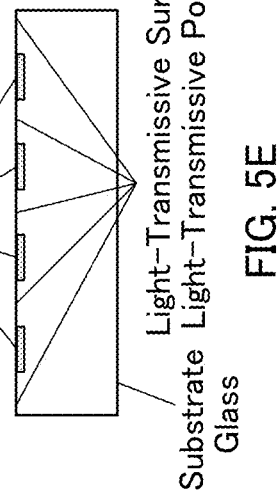
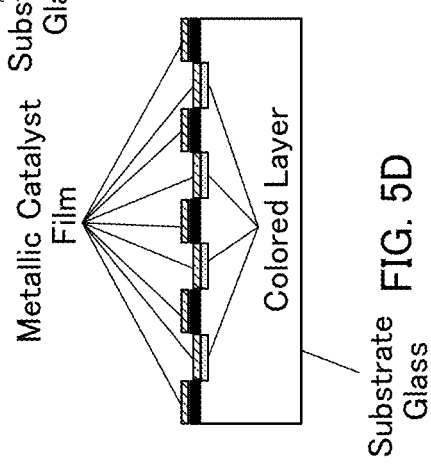
FIG. 5A, FIG. 5B, FIG. 5C, FIG. 5D, FIG. 5E

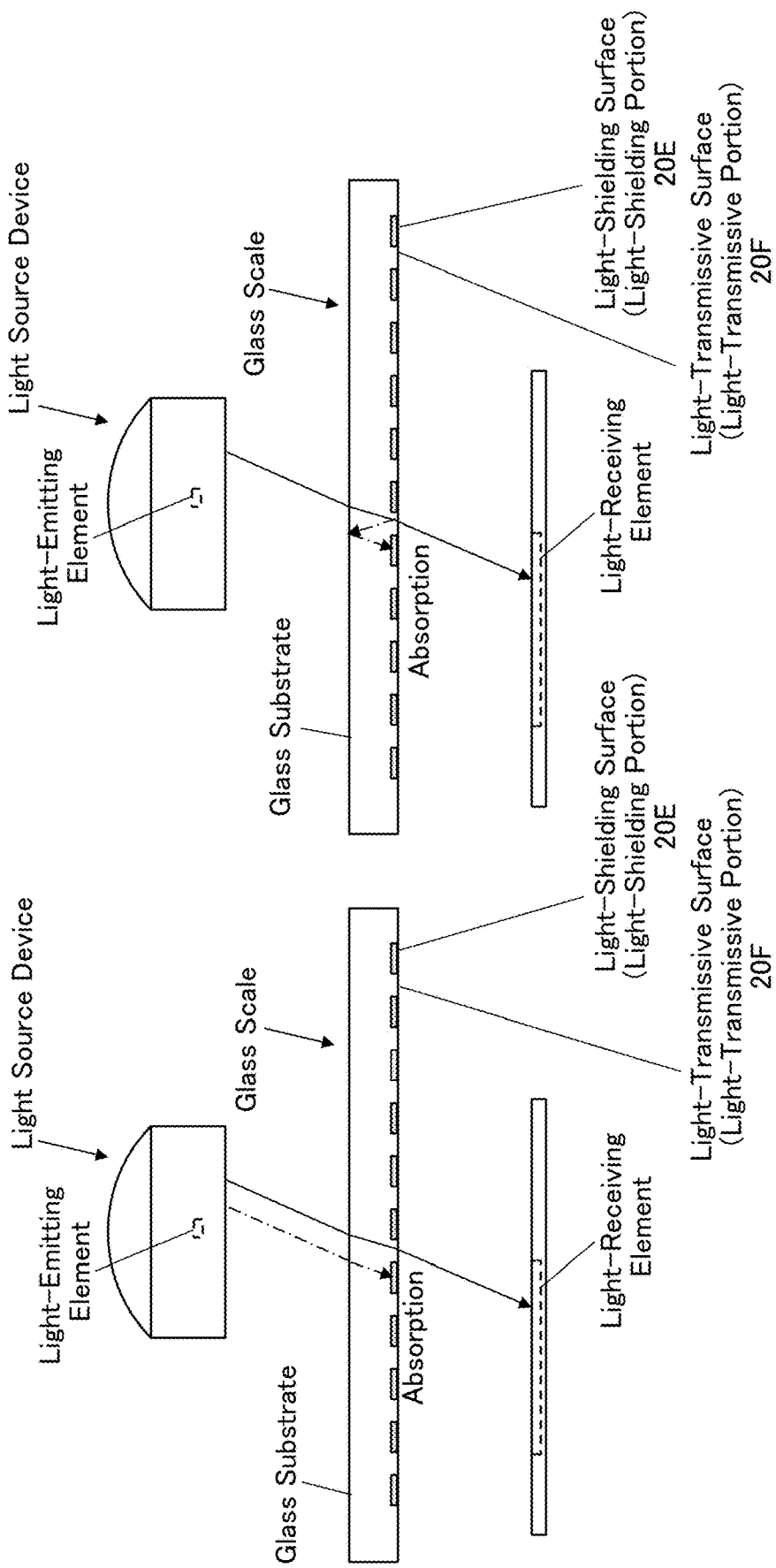

OPTICAL ELEMENT AND OPTICAL APPARATUS

BACKGROUND OF THE INVENTION

1. Field of the Invention

The present disclosure relates to an optical element and an optical apparatus. More specifically, the present disclosure relates to an optical element with added functionality via colored glass, an optical element partially provided with a colored layer, and an optical apparatus that uses either such optical element.

2. Description of Related Art

In the related art, an optical element is known in which a light-shielding pattern is formed on a transparent glass plate, etc., to serve as a function of a transmission slit or a diffraction element.

Patent Literature 1 discloses a glass substrate unit used in a stereoscopic image display device. The glass substrate unit is provided with a glass substrate, a parallax barrier, uneven portions, and color filters. The glass substrate is provided with a first surface facing an image display unit of the stereoscopic image display device, and a second surface on the opposite surface of the first surface. The parallax barrier is formed on the second surface of the glass substrate and has light-shielding sections and light transmitting sections. The uneven portions are formed at positions facing against the light-shielding sections on the second surface of the glass substrate; the uneven portions also have light-scattering characteristics. The color filters are formed on the first surface.

Patent Literature 2 discloses an imaging device provided with an image sensor, a modulator, an image storing unit, and a signal processing unit. The image sensor converts an optical image captured by a plurality of pixels arranged in an array on an imaging surface into an image signal and outputs the image signal. A modulator is provided on a light receiving surface of the image sensor and modulates light intensity. Furthermore, the modulator has a first grating pattern composed of a plurality of concentric circles. The image storing unit temporarily stores the image signal output from the image sensor. The signal processing unit performs image processing of the image signal output from the image storing unit. Furthermore, the signal processing unit modulates the image signal output from the image storing unit with a virtual second grating pattern composed of a plurality of concentric circles so as to generate a moiré fringe image and changes the size of the concentric circles of the second grating pattern according to a focus position.

Patent Literature 3 discloses a photoelectric encoder provided with a light source device that irradiates light, a scale having calibrations arranged along a measuring direction, and a light-receiving device or element that receives light irradiated from the light source device and transmitted through the scale. The photoelectric encoder is provided with an anti-reflection member that prevents stray light that has reflected off the scale from being incident onto the light-receiving device.

Patent Literature 1: Japanese Unexamined Patent Publication No. 2012-168375
Patent Literature 2: International Patent Publication No. WO 2017/149687
Patent Literature 3: Japanese Unexamined Patent Publication No. 2018-197743

However, the optical elements disclosed in Patent Literature 1 through 3 each have room for improvement due to the structure and functional effect of each optical function surface (e.g., the light-shielding section of the parallax barrier in Patent Literature 1, the grating patter in Patent Literature 2, and the scale in Patent Literature 3) not being fully optimized.

SUMMARY OF INVENTION

In view of the aforementioned problems, the illustrated embodiments of the invention provide an optical element and an optical apparatus that can achieve a favorable optical function surface.

The optical element of the present disclosure is provided as a glass body including a colored layer provided inside the glass body and positioned at an optical function surface of the optical element.

In the illustrated embodiments, the term "inside the glass body" refers to the literal meaning of inside the glass body, and also refers to the surface of the glass body. In other words, the colored layer may be positioned from a surface of the glass body and extends inside the glass body, or may be positioned inside the glass body without being positioned on the surface of the glass body.

It is desirable for a thickness of the colored layer from the surface of the glass body and extending inside the glass body to be 1 through 300 μm.

It is desirable for an optical density OD of the colored layer to be 2.0 or more at a wavelength of 750 nm.

It is desirable for the optical function surface to include a plurality of light-transmissive surfaces which are adjacently and alternately arranged with a plurality of light-shielding surfaces, and for a plurality of the colored layers to form the plurality of light-shielding surfaces.

In other words, the plurality of light-shielding surfaces formed by the plurality of colored layers do not exhibit an optical function on their own, but rather exhibit a predetermined optical effect in cooperation with a plurality of light-transmissive surfaces that are arranged alternatively and adjacent to the light-shielding surfaces. Specific examples of applications of such optical function surfaces are a parallax barrier, a zone plate, and a glass scale of an optical encoder.

It is desirable for the optical element to include a parallax barrier, and for the plurality of colored layers to form a plurality of light-shielding surfaces of the parallax barrier.

It is desirable for the optical element to include a zone plate, and for the plurality of colored layers to form a plurality of light-shielding surfaces of the zone plate.

It is desirable for the optical element to include a glass scale (code pattern) for an optical encoder, and for the plurality of color layers to form a plurality of light-shielding surfaces of the glass scale.

It is desirable for the optical element to include at least one of a lens element, a flat parallel plate, a cover glass, an optical filter, a beam splitter, and a prism. The colored layer is provided at an optical function surface of the at least one of the lens element, the flat parallel plate, the cover glass, the optical filter, the beam splitter, and the prism.

In another embodiment, an optical apparatus is provided with any of the above-described optical elements.

Accordingly, an optical element and an optical apparatus, can be provided, which achieve a favorable optical function surface.

The present disclosure relates to subject matter contained in Japanese Patent Application No. 2020-77812 (filed on Apr. 24, 2020) which is expressly incorporated herein in its entirety.

BRIEF DESCRIPTION OF THE DRAWINGS

Embodiments and examples of the invention will be discussed below in detail with reference to the accompanying drawings, in which:

FIG. 3-1 shows a schematic view of an embodiment of the present invention;

FIG. 3-2 shows an explanatory schematic view of the embodiment shown in FIG. 3-1;

FIG. 4 shows a schematic view of an embodiment of the present invention;

FIGS. 5A, 5B, 5C, 5D and 5E show an example of a process of forming a colored pattern on an optical element using a barrier film;

FIG. 6-1 is an image showing a sample of Example 1-1, and a ruler for reference;

FIG. 6-2 is an image showing a sample of Example 1-2, and a ruler for reference;

FIG. 7-1 shows a graph indicating the transparency of a portion of the sample, in Example 1-1, that has a colored layer;

FIG. 7-2 shows a graph indicating the transparency of a portion of the sample, in Example 1-2, that has a colored layer;

FIG. 7-3 shows a graph indicating the transparency of a portion of the sample, in Example 1-3, that has a colored layer;

FIG. 8-1 shows a graph indicating, per each film thickness of metallic films, the transparency of a portion of the sample, in Example 2-1, that has a colored layer;

FIG. 8-2 shows a graph indicating, per each film thickness of metallic films, the transparency of a portion of the sample, in Example 2-2, that has a colored layer;

FIGS. 16A and 16B each show an illustrative view for describing the superiority of a glass scale of an optical encoder of the present disclosure.

DESCRIPTION OF THE EMBODIMENTS

<<Definition of Terms>>

Figure 1:
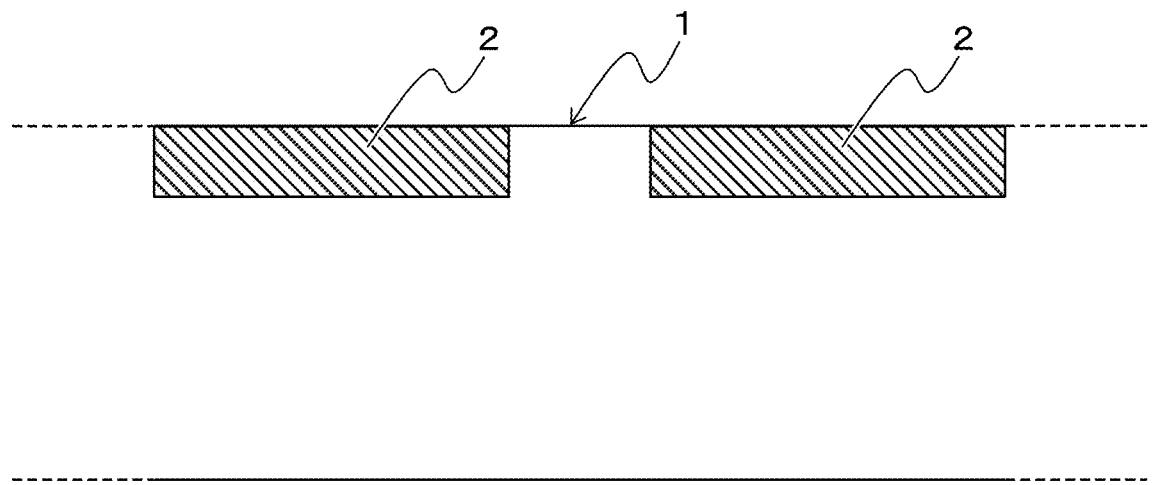
FIG. 1 shows a schematic view of an embodiment of the present invention.

In the present specification, "optical function surface", "light-transmissive surfaces" and "light-shielding surfaces" can be read as "optical function portion", "light-transmissive portions" and "light-shielding portions", respectively. Furthermore, "colored layer" can be read as "colored portion". Furthermore, not all of the incident light on a "light-transmission surface" or a "light-transmissive portion" is necessarily transmitted therethrough; a portion of the incident light may transmit therethrough while another portion thereof may reflect therefrom.

<<Explanation of Basic Principles>>

The optical element of the present disclosure is an optical element (glass element) provided with a glass body, and a colored layer(s) provided within the glass body and positioned at an optical function surface of the optical element.

In the illustrated embodiments/examples, "inside the glass body" refers to the literal meaning of inside the glass body, and also refers to the surface of the glass body. In other words, the colored layer can be provided at a position from the surface of the glass body through to a position inside the glass body, or can be provided at a location inside the glass body without being positioned on the surface of the glass body. In either case, the colored layer takes on the form of an altered layer inside the glass body, so that due to light passing through the glass body being absorbed, achieving a light-shielding function and absorbing light that internally reflects inside the glass body, occurrence of stray light can be suppressed to thereby achieve favorable light-shielding properties. Furthermore, the colored layer that functions as a light-shielding layer exhibits a predetermined optical function in cooperation with layers other than the colored layers (e.g., the adjacent light-transmissive layers).

Firstly, by referring to FIGS. 1 through 10, how the colored layer is formed inside the glass body, the structure and function of the colored layer, and the underlying principle will be discussed.

In the present disclosure, the glass material (glass element) used will be described based on content ratios for each component indicated as cation %. Accordingly, unless otherwise stated, each content amount will be hereinafter referred as "%" or "cation %".

The indication of cation % herein refers to a mole percentage for when a content of all cation components is determined as 100%. Furthermore, the total content amount refers to a total content of a plurality types of cation components (including the case where the content is 0%). Furthermore, a cation ratio refers to a proportion (ratio) of content amounts between two cation components (including total content of a plurality of type of cation components) and will be indicated as a cation %.

The content of a glass component can be quantitatively determined by known methods such as, e.g., Inductively Coupled Plasma-Atomic Emission Spectrometry (ICP-AES) or Inductively Coupled Plasma-Mass Spectrometry (ICP-MS). Furthermore, in the present disclosure (the description and illustrated Examples), a constituent content of 0% refers to such a constituent as, in effect, not being included, but it may include an amount up to an unavoidable impurity level.

In the present disclosure, a refractive index refers to a refractive index nd on the d-line (wavelength 587.56 nm), unless otherwise stated.

The glass material (glass body) disclosed in each Example is provided with a colored layer(s). The color layer is a portion of the glass that is colored, and is preferably formed (positioned) from the glass surface and extends inside the glass to form an altered layer. Alternatively, the colored layer may be formed as an altered layer inside the glass without being formed at the glass surface.

The colored layer constitutes a portion that has a low transmittance with respect to light that is incident on the glass element. Accordingly, in the glass element (glass material) of the illustrated Examples, out of the light that is incident on the glass element, the light that is incident on the colored layer is partially or completely absorbed and the intensity of the transmitted light decays compared to the light that is not incident on the colored layer. In other words, the glass element (glass material) of the illustrated Examples can include a portion that has a low transmittance and a portion that has a high transmittance.

In the glass element of the illustrated Examples, the colored layer can be removed by grinding or polishing. In the glass element of the illustrated Examples, the transmittance of the glass element after the colored layer is removed is greater than the transmittance thereof before the colored layer is removed.

Figure 2:
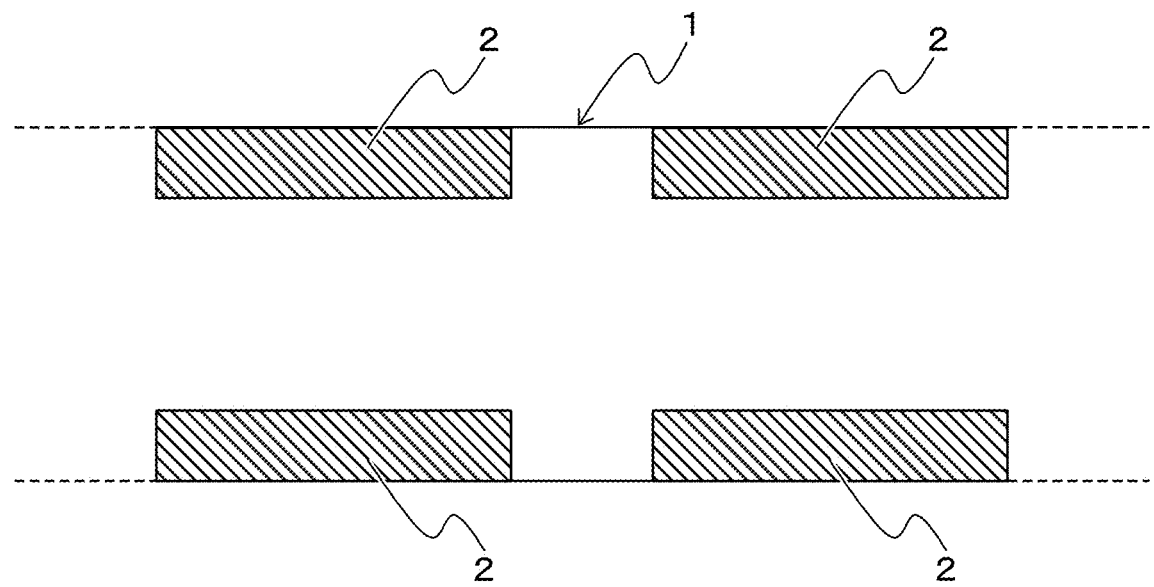
FIG. 2 shows a schematic view of an embodiment of the present invention.

In the illustrated Examples, in the case where the glass element has, e.g., two opposing surfaces, colored layers 1 may be provided only on one side of a glass body 1, as shown in FIG. 1, or may be provided on both sides of the glass body 1, as shown in FIG. 2. In the example shown in FIG. 1, two colored layers 2 are provided on the upper surface of the glass body 1 and are separated from each other in the horizontal direction (leftward/rightward direction). In the example shown in FIG. 2, two colored layers 2, separated from each other in the horizontal direction (leftward/rightward direction), are provided on each of the upper and lower sides of the glass body 1 (so that there are a total of four colored layers 2).

Figures 1, 3:
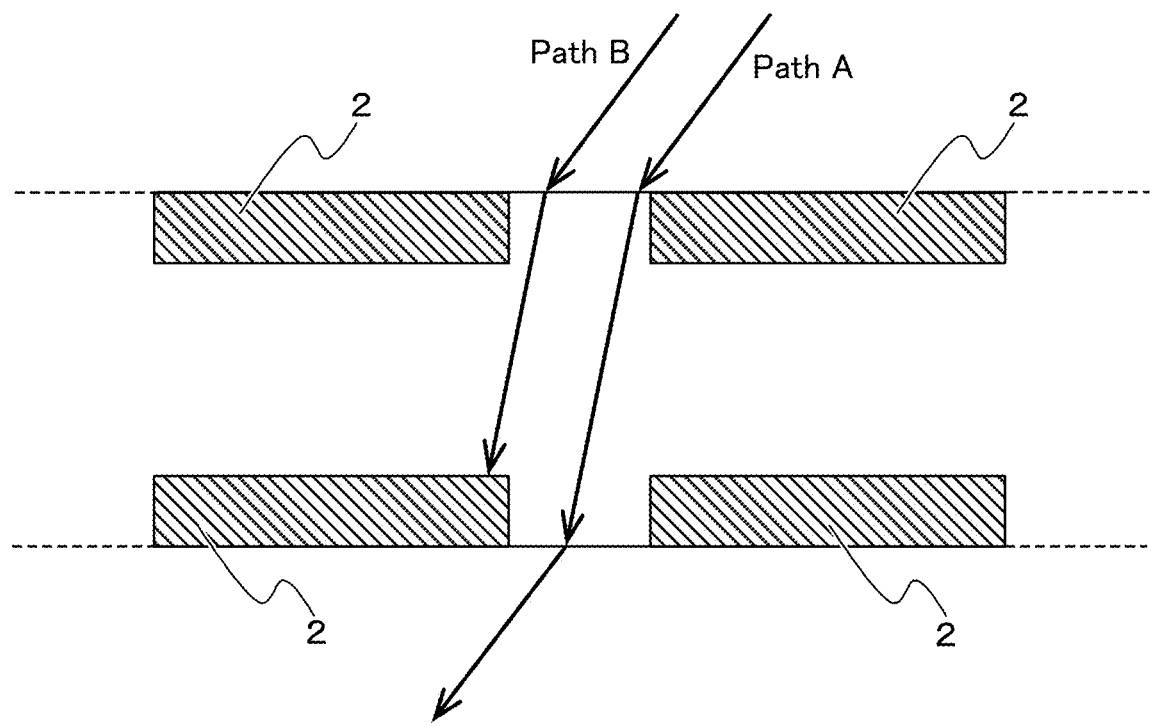
Figures 2, 3:
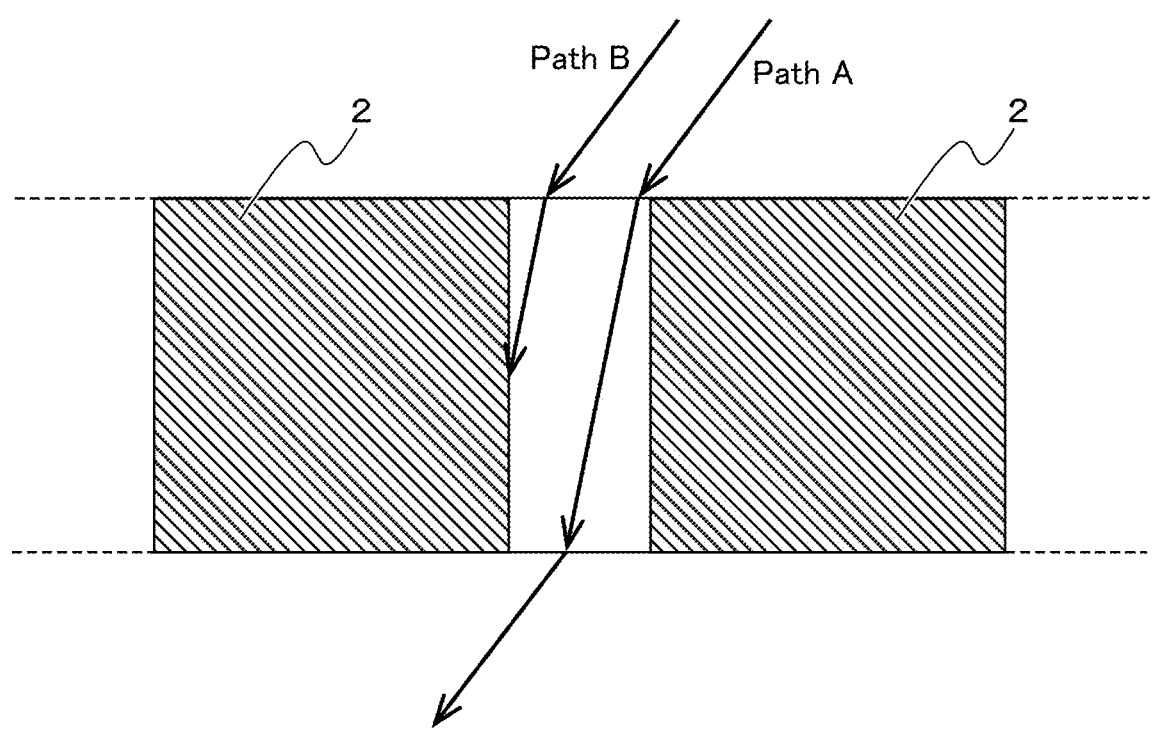

Furthermore, as shown in FIG. 3-1, by selectively forming the colored layers 2 on the glass surface, light can be shielded at portions where the colored layers 2 are formed, and light can be transmitted at portions where the colored layers 2 are not formed. Furthermore, e.g., a slit, diaphragm or pinhole function, etc., can be added to the glass element by forming the colored layers 2 into a specified pattern. Furthermore, the specified pattern may be periodic or aperiodic, linear or curved. The glass surface for forming the colored layer may be a flat surface or a curved surface.

As shown in FIG. 3-1, since there is no colored layer 2 in a light path A, the light along path A transmits from one surface to the other surface. Whereas, since there is a colored layer 2 in path B, the light along path B is absorbed by a colored layer 2 (the left colored layer 2 on the lower surface of the glass body 1 in FIG. 3-1). Furthermore, since the colored layers 2 have the same composition as the non-colored portions (the glass body 1), no difference in refractive index exists within the glass element, nor does light reflect from the boundaries between the colored layers 2 and the non-colored portions. In this case, regarding light transmittance, the same effect can be obtained as in the case where the colored layers 2 are provided across the entire thickness of the glass element, as shown in FIG. 3-2. Note that, as commonly known in the art, the relationship between the incident angle and the angle of refraction is determined by the refractive index at the surface of the glass element and by the refractive index of the medium (such as air) in contact with the glass element. This relationship should be considered when determining the area(s) of the colored layer(s) on the glass surface, the slit width, and the diameter of the diaphragm, etc.

As will be discussed below, the glass element (glass material) of the illustrated Examples can be used as an optical element. From the viewpoint of using the glass element as an optical element, it is desirable for the glass material of the illustrated Examples be optical glass.

In the glass material of the illustrated Examples, the colored layer(s) and the non-colored layer(s) have the same glass component composition. However, the valence of the glass component (cation) maybe different between the colored layer(s) and the non-colored layer(s).

In the glass element (optical element) of each illustrated Example, since the refractive index of the colored layer(s) is the same as that of the glass body, light that is incident onto the colored layer from outside the glass body (as with light that is incident on a non-colored layer from the outside of the glass body) shows reflection properties (Fresnel reflection), depending on the angle of incidence, in accordance with the refractive index of the glass element at the glass surface and the refractive index of the medium (e.g., air) that is in contact with the glass element. Accordingly, a reflection-preventing coating may be coated on the optical element, including a colored portion(s), as necessary, in order to reduce reflection at the glass surface.

It is desirable for the coloring of the colored layer(s) to be a reduction pigment occurring in the glass component, and preferably a reduction pigment occurring in a transition metal. Examples of such a transition metal are Ti (titanium), Nb (niobium), W (tungsten) and Bi (bismuth). Accordingly, it is desirable for the glass material (glass element) of the present disclosure to include, as a glass component, at least one ion selected from the group consisting of Ti-ion, Nb-ion, W-ion, and Bi-ion; the Bi-ion is the most preferable out of this group.

[Thickness of Colored Layer]

Although there are no particular restrictions regarding the thickness of the colored layer (e.g., the thickness of the colored layer extending from the surface of the glass body 1 to the inside thereof), it is desirable for the thickness to be 1 through 300 μm, preferably 20 through 200 μm, and more preferably 30 through 150 μm.

[Optical Density (OD)]

In the glass material of the present disclosure, the spectral transmittance of the colored layer from the visible light region (a wavelength region of 400 nm to 760 nm) through to the infra-red region shows a tendency to increase as the wavelength increases. Whereas, the OD of the colored layer shows a tendency to decrease as the wavelength increases. OD refers to the optical density and, as indicated in the following formula, is expressed as a negative common logarithm value of a ratio of the transmitted light intensity I to the incident light intensity $I_0$.

$$OD = -\log_{10}(I/I_0)$$

In the case where the glass material of the illustrated Examples includes a colored layer(s) and a non-colored portion(s), having a large transmittance in the visible light region, the OD of the colored layer(s) is large, whereas the OD of the non-colored portion(s) is small. When measuring the OD, if the measurement light passes through both a colored layer and a non-colored portion, since the OD of the non-colored portion is sufficiently small, the OD of the colored layer becomes dominant.

Note that in a glass element (glass material) having two opposing surfaces, the OD for the case where incident light passes through colored layers provided on both of the two surfaces is approximately double of the OD for the case where the same-colored layer is provided only on one of the two surfaces.

[Refractive Index]

The refractive index nd of the glass element (glass material) of the present disclosure is desirably 1.70 or more, and is further desirably 1.73 or more, 1.75 or more, 1.76 or more, 1.77 or more, 1.78 or more, 1.79 or more, and 1.80 or more, in that order. Although there is no specified upper limit for the refractive index nd, the upper limit is normally 2.5, and preferably 2.3.

FIG. 4 shows a glass element, having two opposing surfaces, in which a plurality of colored layers is provided at predetermined intervals on the two opposing surfaces at relative (opposing) positions so that the portions where colored layers are not formed function as slits (slit portions). In such a case, if the refractive index is low and the angle of incidence of light rays incident at the slit portions is large (i.e., the light rays are incident at a shallow angle), there is a risk of light rays passing through a neighboring slit, like in path C in FIG. 4, so that the same effect as that obtained by the element shown in FIG. 3-2 cannot be achieved. Whereas, if the refractive index of the glass element is set high, like in the above-indicated ranges, since the light rays, as indicated in path B, are absorbed by a colored layer formed on an undersurface of the glass element, the slit intervals can be narrowed due to the light rays not passing through a neighboring slit.

If the glass element of the illustrated Examples is used as an optical element (or in examples of other applications of use of the optical element), as discussed below, such as, e.g., a lens element, since a glass material having a high refractive index can allow the radius of curvature to be increased (to have a more gentle curvature) in order to achieve a lens element having the same refractive power (focal length), occurrence of various aberrations can be suppressed, and the lens thickness can be slimmed down (made thinner in the optical-axis direction). Furthermore, for example, if the glass element of the illustrated Examples is used in a prism, since a glass material having a high refractive index reduces the critical angle, a wider total-reflection angle range can be achieved for the regular light (effective light rays) incident on a reflection surface of the prism, so that a total-reflection coating does not need to be applied.

[Average Coefficient of Linear Expansion]

In the glass material of the present disclosure, the average coefficient of linear expansion is desirably $50 \times 10^{-7} K^{-1}$ or more, and more preferably $60 \times 10^{-7} K^{-1}$ or more, $70 \times 10^{-7} K^{-1}$ or more, $75 \times 10^{-7} K^{-1}$ or more, $80 \times 10^{-7} K^{-1}$ or more, $85 \times 10^{-7} K^{-1}$ or more, and $90 \times 10^{-7} K^{-1}$ or more, in that order. Although there are no particular restrictions regarding the upper limit of the average coefficient of linear expansion, the upper limit is normally $200 \times 10^{-7} K^{-1}$, and preferably $150 \times 10^{-7} K^{-1}$. By setting the average coefficient of linear expansion to within the above-indicated ranges, the strength of the glass material can be increased if a chemical strengthening applied thereto.

The method of measuring the average coefficient of linear expansion is according to the standards specified in Japan Optical Glass Manufacturers' Association JOGIS08-2003: "Thermal expansion measurement method of optical glass", with the proviso that the cylindrical rod test piece has a diameter of 5 mm.

[Acid Durability Weight Reduction Rate Da]

In the glass material of the present disclosure, the grade of acid resistance weight reduction ratio Da is desirably grade 1 or 2, and preferably grade 1.

The acid durability weight reduction rate Da is measured according to the standards specified in Japan Optical Glass Manufacturers' Association JOGIS06-2009. Specifically, powdered glass (having particle sizes of 425 μm through 600 μm), weighed by its specific gravity, is placed in a platinum basket and soaked in 0.01 mol/L of aqueous solution of nitric acid contained in a quartz glass round-bottomed flask, is treated for 60 minutes in a bath of boiling water, and the weight reduction rate (%) is measured before and after the treatment. The grades for the acid durability weight reduction rate Da are shown in Table A.

TABLE A

| Grade | Weight Reduction Rate (%) |
|---|---|
| 1 | Less than 0.20 |
| 2 | Greater than or Equal to 0.20, and Less than 0.35 |
| 3 | Greater than or Equal to 0.35, and Less than 0.65 |
| 4 | Greater than or Equal to 0.65, and Less than 1.20 |
| 5 | Greater than or Equal to 1.20, and Less than 2.20 |
| 6 | Greater than or Equal to 2.20 |

[Glass Composition]

The following description discusses non-limiting examples of compositions of the glass material of the present disclosure.

It is desirable for the glass material of the present disclosure to be phosphate glass. Phosphate glass refers to a glass containing mainly $P^{5+}$ as a glass network formation component. $P^{5+}$, $B^{3+}$, $Si^{4+}$ and $Al^{3+}$, etc., are known glass network formation components. Note that mainly containing phosphate as a glass network formation component means that the $P^{5+}$ content is greater than each of $B^{3+}$, $Si^{4+}$ and $Al^{3+}$. Using phosphate glass enables an increase in the coloration in the colored layer.

In the glass material of the present disclosure, the lower limit of the $P^{5+}$ content is desirably 10%, and more preferably 13%, 15%, 17% and 20%, in that order. Furthermore, the upper limit of the $P^{5+}$ content is desirably 50%, and more preferably 45%, 40%, 38%, 35%, 33% and 30%, in that order.

$P^{5+}$ is a glass network formation component. Whereas, if an excess amount of $P^{5+}$ is included, the meltability deteriorates. Therefore, it is desirable for the $P^{5+}$ content to be within the above-mentioned ranges.

In the glass material of the present disclosure, the upper limit of the $B^{3+}$ content is desirably 30%, and more preferably 25%, 20%, 15%, 13% and 10%, in that order. Furthermore, the lower limit of the $B^{3+}$ content is desirably 0.1%, and more preferably 0.5%, 1%, 3% and 5%, in that order. The $B^{3+}$ content may be 0%.

$B^{3+}$ is a glass network formation component, and functions to improve the meltability of the glass material. However, if there is too much $B^{3+}$ content, there is a tendency for the chemical durability to deteriorate. Therefore, it is desirable for the $B^{3+}$ content to be within the above-mentioned ranges.

In the glass material of the present disclosure, it is desirable for the upper limit of the cation ratio $[B^{3+}/P^{5+}]$ of the $B^{3+}$ content to the $P^{5+}$ content to be 0.70, and preferably 0.60, 0.55 and 0.50, in that order. The cation ratio $[B^{3+}/P^{5+}]$ may be 0 (zero).

In the glass material of the present disclosure, the upper limit of the $Si^{4+}$ content is desirably 10%, and more preferably 7%, 5%, 3%, 2% and 1%, in that order. Furthermore, the lower limit of the $Si^{4+}$ content is desirably 0.1%, and more preferably 0.2%, 0.3%, 0.4% and 0.5%, in that order. The $Si^{4+}$ content may be 0%.

$Si^{4+}$ is a glass network formation component, and functions to improve thermal stability, chemical durability and weatherability of the glass material. However, if there is too much $Si^{4+}$ content, there is a tendency for the meltability of the glass material to decrease, and for unmelted glass raw material to remain. Therefore, it is desirable for the $Si^{4+}$ content to be within the above-mentioned ranges.

In the glass material of the present disclosure, the upper limit of the $Al^{3+}$ content is desirably 10%, and more preferably 7%, 5%, 3% and 1%, in that order. The $Al^{3+}$ content may be 0%.

$Al^{3+}$ functions to improve the chemical durability and weatherability of the glass material. Whereas, if there is too much $Al^{3+}$ content, the thermal stability of the glass material deteriorates, and the glass transition temperature Tg increases so that the meltability easily decreases. Therefore, it is desirable for the $Al^{3+}$ content to be within the above-mentioned ranges.

In the glass material of the present disclosure, it is desirable for the lower limit of the total content $[P^{5+}+B^{3+}+Si^{4+}+Al^{3+}]$ of $P^{5+}$, $B^{3+}$, $Si^{4+}$ and $Al^{3+}$ to be 10%, and more preferably 15%, 18%, 20%, 23% and 25%, in that order. Furthermore, it is desirable for the upper limit of the total content $[P^{5+}+B^{3+}+Si^{4+}+Al^{3+}]$ to be 60%, and more preferably 50%, 45%, 40%, 37% and 35%, in that order.

The glass material of the present disclosure is desirably provided with a transition metal as a glass component, and preferably at least one glass component selected from the group consisting of Ti-ion, Nb-ion, W-ion, and Bi-ion; the Bi-ion is the most preferable out of this group.

In the glass material of the present disclosure, the lower limit of the Ti-ion content is desirably 1%, and more preferably 2% and 3%, in that order. Furthermore, the upper limit of the Ti-ion content is desirably 45%, and more preferably 40%, 35%, 30%, 25%, 20%, 15% and 12%, in that order. The Ti-ion includes $Ti^{4+}$, $Ti^{3+}$, and all Ti-ions of different valences.

The Ti-ion contributes greatly to achieving a high refractive index, in the same manner as a Nb-ion, a W-ion and a Bi-ion, and has a function of increasing the coloration of the glass material. Whereas, if there is too much Ti-ion content, there is a tendency for the meltability of the glass material to decrease, and for unmelted glass raw material to remain. Therefore, it is desirable for the Ti-ion content to be within the above-mentioned ranges.

In the glass material of the present disclosure, the lower limit of the Nb-ion content is desirably 1%, and more preferably 5%, 10% and 15%, in that order. Furthermore, the upper limit of the Nb-ion content is desirably 45%, and more preferably 40%, 35%, 30%, 25%, 23% and 20%, in that order. The Nb-ion includes $Nb^{5+}$, and all Nb-ions of different valences.

The Nb-ion contributes to achieving a high refractive index, and is a component that increases the coloration of the glass material. Furthermore, Nb-ion also has a function of improving the thermal stability and chemical durability of the glass material. However, if there is too much Nb-ion content, there is a tendency for the thermal stability of the glass material to decrease. Therefore, it is desirable for the Nb-ion content to be within the above-mentioned ranges.

In the glass material of the present disclosure, the upper limit of the W-ion content is desirably 30%, and more preferably 25%, 20%, 15% and 13%, in that order. Furthermore, the lower limit of the W-ion content is desirably 0.5%, and more preferably 1%, 2% and 3%, in that order. The W-ion includes $W^{6+}$, and all W-ions of different valences.

The W-ion contributes to achieving a high refractive index, and has a function of increasing the coloration of the glass material. Therefore, it is desirable for the W-ion content to be within the above-mentioned ranges.

In the glass material of the present disclosure, the upper limit of the Bi-ion content is desirably 40%, and more preferably 35%, 30%, 28% and 25%, in that order. Furthermore, the lower limit of the Bi-ion content is desirably 0.5%, and more preferably 1%, 2% and 2.5%, in that order. The Bi-ion includes $Bi^{3+}$, and all Bi-ions of different valences.

The Bi-ion contributes to achieving a high refractive index, and has a function of increasing the coloration of the glass material. Therefore, it is desirable for the Bi-ion content to be within the above-mentioned ranges.

In the glass material of the present disclosure, it is desirable for the lower limit of the total content [Ti+Nb+W] of the Ti-ion, the Nb-ion and the W-ion to be 1%, and more preferably 5%, 10%, 15%, 20% and 23%, in that order. Furthermore, it is desirable for the upper limit of the total content [Ti+Nb+W] to be 60%, and more preferably 55%, 50%, 45%, 40%, 38% and 35%, in that order.

In the glass material of the present disclosure, it is desirable for the upper limit of the total content [Ti+Nb+W+Bi] of the Ti-ion, the Nb-ion, the W-ion and the Bi-ion to be 80%, and more preferably 75%, 70%, 68% and 65%, in that order. Furthermore, it is desirable for the lower limit of the total content [Ti+Nb+W+Bi] to be 1%, and more preferably 5%, 10%, 15%, 20%, 23% and 25%, in that order.

In the glass material of the present disclosure, it is desirable for the lower limit of the cation ratio $[(Ti+Nb+W+Bi)/(P^{5+}+B^{3+}+Si^{4+})]$ of the total content of the Ti-ion, the Nb-ion, the W-ion and the Bi-ion with respect to the total content of $P^{5+}$, $B^{3+}$ and $Si^{4+}$ to be 0.1, and more preferably 0.3, 0.5, 0.6 and 0.7, in that order. Furthermore, it is desirable for the upper limit of the cation ratio $[(Ti+Nb+W+Bi)/(P^{5+}+B^{3+}+Si^{4+})]$ to be 4.0, and more preferably 3.5, 3.0, 2.7 and 2.5, in that order.

In the glass material of the present disclosure, the upper limit of the $Ta^{5+}$ content is desirably 5%, and more preferably 3%, 2% and 1%, in that order. The $Ta^{5+}$ content may be 0%.

$Ta^{5+}$ has a function of improving the thermal stability of the glass material. Whereas, if there is too much $Ta^{5+}$ content, there is a tendency for the glass material to have a decreased refractive index and for the meltability of the glass material to decrease. Therefore, it is desirable for the $Ta^{5+}$ content to be within the above-mentioned ranges.

In the glass material of the present disclosure, the upper limit of the $Li^+$ content is desirably 35%, and more preferably 30%, 27%, 25%, 23% and 20%, in that order. Furthermore, the lower limit of the $Li^+$ content is desirably 1%, and more preferably 2%, 3%, 5% and 8%, in that order. The $Li^+$ content may be 0%.

In the glass material of the present disclosure, the upper limit of the $Na^+$ content is desirably 40%, and more preferably 35%, 30%, 25%, 20% and 18%, in that order. Furthermore, the lower limit of the $Na^+$ content is desirably 0.5%, and more preferably 1%, 1.5%, 3% and 5%, in that order. The $Na^+$ content may be 0%.

Including $Li^+$ or $Na^+$ in the glass material facilitates the chemical strengthening process on the glass material. However, if there is too much $Li^+$ or $Na^+$ content, there is a risk that the thermal stability of the glass material decreases. Therefore, it is desirable for each $Li^+$ and $Na^+$ content to be within the above-mentioned ranges, respectively.

In the glass material of the present disclosure, it is desirable for the upper limit of the total content [Li$^+$+Na$^+$] of the Li$^+$ and Na$^+$ to be 45%, and more preferably 43%, 40% and 38%, in that order. Furthermore, it is desirable for the lower limit of the total content [Li$^+$+Na$^+$] to be 1%, and more preferably 5%, 10%, 15% and 20%, in that order.

In the glass material of the present disclosure, the upper limit of the K$^+$ content is desirably 20%, and more preferably 15%, 13%, 10%, 8%, 5% and 3%, in that order. Furthermore, the lower limit of the K$^+$ content is desirably 0.1%, and more preferably 0.5%, 1.0% and 1.2%, in that order. The K$^+$ content may be 0%.

K$^+$ has a function of improving the thermal stability of the glass material. Whereas, if there is too much K$^+$ content, there is a tendency for the thermal stability of the glass material to decrease. Therefore, it is desirable for the K$^+$ content to be within the above-mentioned ranges.

In the glass material of the present disclosure, the upper limit of the Rb$^+$ content is desirably 5%, and more preferably 3%, 1% and 0.5%, in that order. The Rb$^+$ content may be 0%.

In the glass material of the present disclosure, the upper limit of the Cs$^+$ content is desirably 5%, and more preferably 3%, 1% and 0.5%, in that order. The Cs$^+$ content may be 0%.

Rb$^+$ and Cs$^+$ both have a function of improving meltability of the glass material. However, if there is too much Rb$^+$ and/or Cs$^+$ content, the refractive index nd decreases, and there is a risk of the volatility of the glass components increase during melting. Therefore, it is desirable for each Rb$^+$ and Cs$^+$ content to be within the above-mentioned ranges, respectively.

In the glass material of the present disclosure, the upper limit of the Mg$^{2+}$ content is desirably 15%, and more preferably 10%, 5%, 3% and 1%, in that order. The Mg$^{2+}$ content may be 0%.

In the glass material of the present disclosure, the upper limit of the Ca$^{2+}$ content is desirably 15%, and more preferably 10%, 5%, 3% and 1%, in that order. The Ca$^{2+}$ content may be 0%.

In the glass material of the present disclosure, the upper limit of the Sr$^{2+}$ content is desirably 15%, and more preferably 10%, 5%, 3% and 1%, in that order. The Sr$^{2+}$ content may be 0%.

In the glass material of the present disclosure, the upper limit of the Ba$^{2+}$ content is desirably 25%, and more preferably 20%, 18%, 15%, 10% and 5%, in that order. The Ba$^{2+}$ content may be 0%.

Mg$^{2+}$, Ca$^{2+}$, Sr$^{2+}$ and Ba$^{2+}$ each having a function of improving thermal stability and improving meltability of the glass material. However, if there is too much content of any of Mg$^{2+}$, Ca$^{2+}$, Sr$^{2+}$ and Ba$^{2+}$, high refractive index properties are lost, and there is a risk of the thermal stability of the glass material decreasing. Therefore, it is desirable for each Mg$^{2+}$, Ca$^{2+}$, Sr$^{2+}$ and Ba$^{2+}$ content to be within the above-mentioned ranges, respectively.

In the glass material of the present disclosure, it is desirable for the upper limit of the total content [Mg$^{2+}$+Ca$^{2+}$+Sr$^{2+}$+Ba$^{2+}$] of Mg$^{2+}$, Ca$^{2+}$, Sr$^{2+}$ and Ba$^{2+}$ to be 30%, and more preferably 25%, 20%, 18%, 15%, 10% and 5%, in that order.

In the glass material of the present disclosure, the upper limit of the Zn$^{2+}$ content is desirably 15%, and more preferably 10%, 8%, 5%, 3% and 1%, in that order. Furthermore, the lower limit of the Zn$^{2+}$ content is desirably 0.1%, and more preferably 0.3% and 0.5%, in that order. The Zn$^{2+}$ content may be 0%.

Zn$^{2+}$ has a function of improving the thermal stability of the glass material. Whereas, if there is too much Zn$^{2+}$ content, there is a tendency for the meltability of the glass material to deteriorate. Therefore, it is desirable for the Zn$^{2+}$ content to be within the above-mentioned ranges.

In the glass material of the present disclosure, the upper limit of the Zr$^{4+}$ content is desirably 5%, and more preferably 3%, 2% and 1%, in that order. The Zr$^{4+}$ content may be 0%.

Zr$^{4+}$ has a function of improving the thermal stability of the glass material. Whereas, if there is too much Zr$^{4+}$ content, there is a tendency for the thermal stability and the meltability of the glass material to deteriorate.

Therefore, it is desirable for the Zr$^{4+}$ content to be within the above-mentioned ranges.

In the glass material of the present disclosure, the upper limit of the Ga$^{3+}$ content is desirably 3%, and more preferably 2% and 1%, in that order. Furthermore, the lower limit of the Ga$^{3+}$ content is desirably 0%. The Ga$^{3+}$ content may be 0%.

In the glass material of the present disclosure, the upper limit of the In$^{3+}$ content is desirably 3%, and more preferably 2% and 1%, in that order. Furthermore, the lower limit of the In$^{3+}$ content is desirably 0%. The In$^{3+}$ content may be 0%.

In the glass material of the present disclosure, the upper limit of the Sc$^{3+}$ content is desirably 3%, and more preferably 2% and 1%, in that order. Furthermore, the lower limit of the Sc$^{3+}$ content is desirably 0%. The Sc$^{3+}$ content may be 0%.

In the glass material of the present disclosure, the upper limit of the Hf$^{4+}$ content is desirably 3%, and more preferably 2% and 1%, in that order. Furthermore, the lower limit of the Hf$^{4+}$ content is desirably 0%. The Hf$^{4+}$ content may be 0%.

In the glass material of the present disclosure, the upper limit of the Lu$^{3+}$ content is desirably 3%, and more preferably 2% and 1%, in that order. Furthermore, the lower limit of the Lu$^{3+}$ content is desirably 0%. The Lu$^{3+}$ content may be 0%.

In the glass material of the present disclosure, the upper limit of the Ge$^{4+}$ content is desirably 3%, and more preferably 2% and 1%, in that order. Furthermore, the lower limit of the Ge$^{4+}$ content is desirably 0%. The Ge$^{4+}$ content may be 0%.

In the glass material of the present disclosure, the upper limit of the La$^{3+}$ content is desirably 5%, and more preferably 4% and 3%, in that order. Furthermore, the lower limit of the La$^{3+}$ content is desirably 0%. The La$^{3+}$ content may be 0%.

In the glass material of the present disclosure, the upper limit of the Gd$^{3+}$ content is desirably 5%, and more preferably 4% and 3%, in that order. Furthermore, the lower limit of the Gd$^{3+}$ content is desirably 0%. The Gd$^{3+}$ content may be 0%.

In the glass material of the present disclosure, the upper limit of the Y$^{3+}$ content is desirably 5%, and more preferably 4% and 3%, in that order. Furthermore, the lower limit of the Y$^{3+}$ content is desirably 0%. The Y$^{3+}$ content may be 0%.

In the glass material of the present disclosure, the upper limit of the Yb$^{3+}$ content is desirably 3%, and more preferably 2% and 1%, in that order. Furthermore, the lower limit of the Yb$^{3+}$ content is desirably 0%. The Yb$^{3+}$ content may be 0%.

It is desirable for the cation components of the glass material of the present disclosure to be formed from mainly the above-mentioned components, namely, P$^{5+}$, B$^{3+}$, Si$^{4+}$, Al$^{3+}$, Ti-ion, Nb-ion, W-ion, Bi-ion, Ta$^{5+}$, Li$^+$, Na$^+$, K$^+$, Rb$^+$, Cs$^+$, Mg$^{2+}$, Ca$^{2+}$, Sr$^{2+}$, Ba$^{2+}$, Zn$^{2+}$, Zr$^{4+}$, Ga$^{3+}$, In$^{3+}$, Sc$^{3+}$, Hf$^{4+}$, Lu$^{3+}$, Ge$^{4+}$, La$^{3+}$, Gd$^{3+}$, Y$^{3+}$ and Yb$^{3+}$. It is desirable for the total content of the above-mentioned components to be greater than 95%, more preferably greater than 98%, more preferably greater than 99%, and even more preferably greater than 99.5%.

The glass material of the present disclosure may include a component, other than $F^-$ and $O^{2-}$, as an anion component. Examples of anion components, other than $F^-$ and $O^{2-}$, are $Cl^-$, $Br^-$ and $I^-$. However, each of $Cl^-$, $Br^-$ and $I^-$ can easily volatize during melting of the glass material. The volatizing of these components causes problems such as: the properties of the glass material fluctuating, the homogeneity of the glass material decreasing, and wear and tear occurring in the melting equipment becomes prominent. Accordingly, it is desirable for the $Cl^-$ content to be less than 5 anion %, and more preferably less than 3 anion %, more preferably less than 1 anion %, more preferably less than 0.5 anion %, and even more preferably 0.25 anion %. Furthermore, it is desirable the total content of $Br^-$ and $I^-$ to be less than 5 anion %, and more preferably less than 3 anion %, more preferably less than anion %, more preferably less than 0.5 anion %, more preferably less than 0.1 anion %, and even more preferably 0 anion %.

Note that anion % refers to a mol percentage with the content of all anions totaling to 100%.

Although it is desirable for the glass material of the present disclosure to be fundamentally formed from the above-mentioned components, it is possible for other components to also be included within a range that does not impede the functional effects of the illustrated Examples.

The glass material of the present disclosure may, for example, further include an appropriate amount of copper (Cu) as a glass component to contribute to near-infrared light absorbing properties of the glass material. V, Cr, Mn, Fe, Co, Ni, Pr, Nd, Pm, Sm, Eu, Tb, Dy, Ho, Er, Tm or Ce, etc., may also be included in the glass material. These elements increase the coloration of the colored layer, and can be a generation source for fluorescence excitation.

The illustrated examples of the present disclosure do not exclude unavoidable impurities.

<Other Component Compositions>

Pb, As, Cd, Tl, Be and Se each have toxicity. Therefore, it is desirable not to include these elements as glass components in the glass material of the present disclosure.

U, Th and Ra each are radioactive elements. Therefore, it is desirable not to include these elements as glass components in the glass material of the present disclosure.

$Sb^{3+}$, $Sn^{4+}$ and $Ce^{4+}$ are glass components, which can be added as desired, and function as a fining agent. Out of these components, $Sb^{3+}$ produces the greatest fining effect.

The $Sb^{3+}$ content is converted to $Sb_2O_3$, and is indicated as a wt % external ratio. The external ratio indication refers to an indication in wt % of the $Sb_2O_3$ content when the content ratio of the cation components other than $Sb^{3+}$, $Sn^{4+}$ and $Ce^{4+}$ is converted to an oxide, in the same manner as $Sb_2O_3$, so that the total content ratio of all the cation components other than $Sb^{3+}$, $Sn^{4+}$ and $Ce^{4+}$ becomes 100 wt %. It is desirable for the content of $Sb_2O_3$ to be less than 2 wt %, and more preferably less than 1 wt %, more preferably less than 0.5 wt %, more preferably less than 0.2 wt %, more preferably less than 0.1 wt %, more preferably less than 0.05 wt %. The fining of the glass material can be improved by determining the content of $Sb_2O_3$ within the above-mentioned ranges.

Each content of $Sn^{4+}$ and $Ce^{4+}$ is converted into oxides and are indicated as external ratios. Namely, the content ratio of cation components other than $Sb^{3+}$, $Sn^{4+}$ and $Ce^{4+}$ are converted to oxides, and the content of $SnO_2$ and the content of $CeO_2$ are indicated as wt % when the total content ratios of all the cation components other than $Sb^{3+}$, $Sn^{4+}$ and $Ce^{4+}$ becomes 100 wt %. It is desirable for the content of $SnO_2$ and $CeO_2$ to be respectively less than 2 wt %, and more preferably less than 1 wt %, more preferably less than 0.5 wt %, and more preferably less than 0.1 wt %. Each content of $SnO_2$ and $CeO_2$ maybe 0 wt %. The fining of the glass material can be improved by determining each content of $SnO_2$ and $CeO_2$ within the above-mentioned ranges.

[Manufacture of Glass Material]

The glass material of the present disclosure is obtained by producing a glass material with no coloration, and thereafter forming a colored layer. The glass material (glass element) with no coloration may be produced in accordance with a known glass manufacturing method. For example, a glass material can be obtained by mixing a plurality of different types of compounds, which are sufficiently mixed to produce a batch of raw materials, this batch of raw materials is introduced into a melting vessel to be melted, via which molten glass is formed after fining and homogenization, and is gradually cooled to produce to a glass material. Alternatively, the batch of raw materials is introduced into a melting vessel and rough melted. The molten material obtained by rough melting is rapidly cooled, and formed into a cullet. Thereafter, the cullet is inserted into the melting vessel, and is heated and re-melted to become molten glass, in which molten glass is molded after fining and homogenization, and is gradually cooled to produce to a glass material. A known method may be applied for the molding and gradual cooling of the molten glass.

Furthermore, in the manufacturing process of the glass material of the illustrated Examples, a process for increasing the amount of moisture within the molten glass may be included. Examples of processes for increasing the amount of moisture within the molten glass may be: a process of adding steam in a melting atmosphere, or a process of bubbling gas that includes steam within the molten material. Out of these two methods, it is desirable to include the process of adding steam in a melting atmosphere. By including a process for increasing the amount of moisture within the molten glass, the pox value of the glass material can be increased. By increasing the pox value of the glass material, a glass material having a higher transparency can be achieved.

[Formation of Colored Layer]

A colored layer can be formed by forming a metallic catalyst film onto the glass surface (of the glass element) and subjecting the metallic catalyst film to a heat treatment in a reduction atmosphere.

It is desirable for the metal used to form the metallic catalyst film to be a metal that occludes hydrogen ions in the atmosphere, and has a function of reducing the glass components included in the glass material via the transfer of hydrogen ions and electrons. Furthermore, a metal having a function of reducing a transition metal out of the glass components is more preferable. Specifically, e.g., Au, Ag, Pt, Ni and Pt—Pd alloy, etc.

Although there are no particular limitations regarding the method of forming the metallic catalyst film onto the glass surface, providing that the metallic catalyst film can adhere onto the glass surface, possible examples are, e.g., evaporated deposition, sputtering, or applying a metallic paste.

The reduction atmosphere is only required to include a gas that has reducing power. An example of a gas having reducing power is hydrogen. Accordingly, it is desirable to use a hydrogen-containing gas as a reduction atmosphere, and a forming gas containing hydrogen may be used. A forming gas is a mixed gas of hydrogen and nitrogen, and normally includes about 3 through 5 vol % of hydrogen.

The heat treatment process is carried out by heating at a temperature greater than or equal to a temperature that is 200° C. lower than the glass transition temperature Tg (Tg−200) and less than or equal to the softening point temperature. The heat treatment process can be appropriately adjusted in accordance with a desired coloration, range (area) of the colored layer, and thickness of the colored layer, etc.

Due to the heat treatment process in a reduction atmosphere, a colored layer is formed from the glass surface, which is in contact with the metallic catalyst film, to inside the glass material (glass element).

After the heat treatment process, the metallic catalyst film is detached from the glass surface. Although there are no particular restrictions on the method of detaching the metallic catalyst film, detaching methods such as polishing or melting may be used.

Although there are no particular restrictions regarding the mechanism involved in the formation of the colored layer via the above-mentioned methods, the following describes a conceivable method.

The coloration of the colored layer formed in the illustrated embodiments is understood as being a reduction pigment occurring in the glass component, namely, a reduction pigment occurring in the transition metal. Usually, even if a glass molded body were to be subject to a heat treatment process in a reduction atmosphere that includes a low concentration of hydrogen, of approximately 3 through 5 vol %, hardly any reduction pigment would be present in the glass molded body. However, since the above-described metallic catalyst film occludes hydrogen ions in the atmosphere, a large amount of hydrogen ions is supplied to the portion of glass material that is in contact with the metallic catalyst film, compared to the portion of the glass material that is not in contact with the metallic catalyst film, resulting in the reduction reaction rapidly progressing. Accordingly, the portion of the glass material that is in contact with the metallic catalyst film is densely colored. The occlusion amount of hydrogen ions by the metallic catalyst film is great, insomuch as to lower the hydrogen concentration in the atmosphere due to the occlusion of the metallic catalyst film; hence, the progress of the reduction reaction at the portion of the glass material that is not in contact with the metallic catalyst film is also hindered due to this reason.

The reduction reaction of the glass components that causes coloration progresses in various directions from the portion of the glass material that is in contact with the metallic catalyst film. In other words, upon observing a cross section of the glass material, the colored layer is formed in the thickness direction from the surface of the glass material to which the metallic catalyst film is in contact, and upon observing from (above) the surface of the glass material, the colored layer is formed radially from the surface of the glass material to which the metallic catalyst film is in contact.

According to the above-described method, a colored layer having a denser coloration can be formed. Accordingly, even if the thickness of the colored layer is small, the transparency can be sufficiently decreased. If the thickness of the colored layer is small, the range (area) of the colored layer that is formed radially from the portion of the glass material that was in contact with the metallic catalyst film is also small when observed from (above) the surface of the glass material. In other words, according to the illustrated embodiments, by adjusting the formation conditions of the colored layer, a colored layer having substantially the same shape (when observed from the surface of the glass material) as the metallic catalyst film can be formed.

Furthermore, in order to obtain a fine colored pattern (a pattern in which respective light-transmissive surfaces of a plurality of light-transmissive surfaces and respective light-shielding surfaces of a plurality of light-shielding surfaces are alternately and adjacently arranged) applied to an optical element (such as that described further below) before forming a metal catalytic film onto the glass surface, a barrier film that prevents contact with the metal catalytic film may be first formed on a portion of the glass surface that is to be used as a non-colored portion, and then the metal catalytic film may be formed thereon.

Although there are no particular restrictions on the method of forming the barrier film, methods such as, e.g., lithography, using an inkjet printer, screen printing, vapor deposition, or sputtering, which are methods that can be used to form a fine pattern, maybe employed to adhere resin, thin film, etc., onto a portion of the glass surface that is to be used as a non-colored portion.

Alternatively, a method may be employed in which, after adhering the barrier film onto the entire glass surface, the barrier film that is adhered to a portion of the glass surface where the colored layer is to be formed can be removed using a laser drawing machine, etc., leaving the barrier film on the glass surface that is to be used as the non-colored portion.

A material that inhibits the transfer of hydrogen ions and electrons in a reducing atmosphere is a desirable material for use for forming the barrier film.

Upon forming a metallic catalyst film onto the entire surface of the glass element including on top of the barrier film that is formed on the portion of the glass surface that is to be a non-colored portion, the metallic catalyst film that is formed onto the surface of the non-colored portion does not directly contact the glass surface due to the intervening barrier layer; the metallic catalyst film is in contact with only the portion of the glass surface at which the colored layer is to be formed. In this state, upon subjecting the metallic catalyst film to a heat treatment in a reduction atmosphere, since the transfer of hydrogen ions and electrons is suppressed at the portion of the glass surface that is to be a non-colored portion, and a reduction reaction of the glass composition is also suppressed at the portion of the glass surface that is to be a non-colored portion, a reduction reaction progresses only at the portion of the glass surface at which a colored layer is to be formed, so that the fine pattern formed on the non-colored portion can be transferred.

Due to the heat treatment process in a reduction atmosphere, a colored layer is formed from the glass surface, which is in contact with the metallic catalyst film, toward the inside of the glass material (glass element). After the heat treatment process, the metallic catalyst film and the barrier film are detached from the glass surface. Although there are no particular restrictions on the method of detaching the metallic catalyst film and barrier film, detaching methods such as polishing or melting may be used.

FIGS. 5A, 5B, 5C, 5D and 5E show an example of a process of forming a colored pattern on an optical element using a barrier film.

A substrate glass is prepared, as shown in FIG. 5A.

Thereafter, as shown in FIG. 5B, a plurality of barrier films is formed onto the upper surface of the substrate glass in a configuration of five (5) barrier films separated from each other in the horizontal direction.

Thereafter, as shown in FIG. 5C, a metallic catalyst film is formed onto the substrate glass. The metallic catalyst film is formed onto the five (5) barrier films, separated from each other in the horizontal direction, and also is formed onto the upper surfaces of the substrate glass on which the barrier films are not formed (in between the five barrier films).

Thereafter, as shown in FIG. 5D, a heat treatment in a reduction atmosphere is carried out. Accordingly, colored layers positioned from the surface of the substrate glass and extending inside the substrate glass are formed underneath the metallic catalyst film that is formed on top of the substrate glass at portions where the barrier films are not formed (in between the five barrier films).

Thereafter, as shown in FIG. 5E, the barrier film and metallic catalyst film that remain on the substrate glass are removed. Consequently, a plurality of colored layers positioned from the surface of the substrate glass and extending inside the substrate glass are formed at positions separated from each other in the horizontal direction (leftward/rightward direction). The plurality of colored layers function as a plurality of light-shielding surfaces (light-shielding portions). Furthermore, a plurality of light-transmissive surfaces (light-transmissive portions) are respectively formed between the plurality of light-shielding surfaces (light-shielding portions).

[Manufacture of Optical Element]

An optical element formed from a glass material of the present disclosure is obtained by preparing (producing) an optical element having no coloration, and forming a colored layer on/in the optical element. The optical element having no coloration can be produced via a known manufacturing method; for example, by pouring molten glass into a casting mold to form a tablet shape, thereby producing the glass material. The obtained glass material can be appropriately, cut, ground and polished to produce a cut piece having a shape and size suitable for press molding. The cut piece is thereafter heated, softened, press-molded via a known method (reheat press forming), thereby producing an optical element blank having a shape (profile) close to the shape (profile) of the target optical element. The optical element blank is annealed, is ground and polished by a known method, to thereby produce an optical element. Alternatively, a precision press-molding glass gob or preform can be produced according to a known manufacturing method, in which a heated and softened glass gob or preform is precision press-molded in an optical-element molding die, to thereby produce an optical element.

A colored layer can be formed in the produced optical element by the above-described method. The colored layer may be formed at a stage during the production of the optical element.

An anti-reflection coating or a total reflection coating may be applied (coated) on the optical function surface of the produced optical element in accordance with intended use.

According to the present disclosure, an optical element formed from the above-described glass material can be provided. Examples of different types of the optical element are: a parallax barrier, a zone plate, and a glass scale of an optical encoder (these examples will be discussed in detail later). Alternatively, other types of the optical element can be, for example: a spherical lens element, an aspherical lens element, a prism, and diffraction grating lens element, etc. Examples of different shapes (profiles) the lens element are: a biconvex lens element, a planoconvex lens element, a biconcave lens element, a planoconcave lens element, a convex meniscus lens element, and a concave meniscus lens element, etc. The optical element can be manufactured according to a method including the process of machining a glass molded body formed from the above-described glass material. Examples of a machining process are: cutting, milling, rough grinding, precision grinding, polishing, and precision press-forming, etc.

EXAMPLES

The following is a detailed description of the Examples pertaining to the present disclosure; however, the present invention is not limited to these Examples.

A glass sample having the glass composition shown in Table 1 was prepared by the following procedure and various evaluations were performed.

TABLE 1

| | No. | No. 1 | No. 2 | No. 3 |
|---|---|---|---|---|
| Cation % | $Si^{4+}$ | 0.0 | 0.0 | 0.0 |
| | $B^{3+}$ | 2.9 | 0.0 | 6.5 |
| | $P^{5+}$ | 28.0 | 27.2 | 26.3 |
| | $Li^+$ | 8.5 | 0.0 | 19.7 |
| | $Al^{3+}$ | 0.0 | 0.0 | 0.0 |
| | $Na^+$ | 8.0 | 1.9 | 16.4 |
| | $K^+$ | 1.9 | 1.4 | 2.3 |
| | $Mg^{2+}$ | 0.0 | 0.0 | 0.0 |
| | $Ca^{2+}$ | 0.0 | 0.0 | 0.0 |
| | $Sr^{2+}$ | 0.0 | 0.0 | 0.0 |
| | $Ba^{2+}$ | 0.8 | 4.0 | 0.5 |
| | $Zn^{2+}$ | 0.0 | 0.0 | 0.9 |
| | Ti-ion | 4.0 | 10.4 | 3.0 |
| | Nb-ion | 19.5 | 19.4 | 19.0 |
| | W-ion | 4.0 | 11.0 | 2.7 |
| | Bi-ion | 22.4 | 24.7 | 2.7 |
| | $Ta^{5+}$ | 0.0 | 0.0 | 0.0 |
| | $Zr^{4+}$ | 0.0 | 0.0 | 0.0 |
| | $La^{3+}$ | 0.0 | 0.0 | 0.0 |
| | $Gd^{3+}$ | 0.0 | 0.0 | 0.0 |
| | $Y^{3+}$ | 0.0 | 0.0 | 0.0 |
| | $Yb^{3+}$ | 0.0 | 0.0 | 0.0 |
| | Total | 100 | 100 | 100 |
| | $B^{3+}/P^{5+}$ | 0.104 | 0.000 | 0.247 |
| | $P^{5+} + B^{3+} + Si^{4+} + Al^{3+}$ | 30.9 | 27.2 | 32.8 |
| | Ti + Nb + W + Bi | 49.9 | 65.5 | 27.4 |
| | Ti + Nb + W | 27.5 | 40.8 | 24.7 |
| | (Ti + Nb + W + Bi)/ $(P^{5+} + B^{3+} + Si^{4+})$ | 1.615 | 2.408 | 0.835 |
| | $Li^+ + Na^+$ | 16.5 | 1.9 | 36.1 |
| | $Mg^{2+} + Ca^{2+} + Sr^{2+} + Ba^{2+}$ | 0.8 | 4.0 | 0.5 |
| Mass % (External Ratio) | $Sb_2O_3$ | 0.1 | 0.02 | 0.01 |
| Properties | Refractive Index nd | 2.00 | 2.10 | 1.82 |
| | Specific Gravity (g/cm³) | 5.1 | 5.6 | 3.7 |
| | Tg (° C.) | 479 | 561 | 454 |
| | Coefficient of Expansion (×10⁻⁷/K) | 101 | 82 | 121 |
| | Acid Durability Weight Reduction Rate (Da) | Grade 1 | Grade 1 | Grade 1 |

[Manufacture of Glass Material]

Oxides, hydroxides, metaphosphates, carbonates, and nitrates corresponding to the constituent components of the glass material were prepared as raw materials, and the raw materials are weighed and prepared so that the compositions of the obtained glass material correspond to each composition shown in Table 1, and the raw materials were mixed well. The obtained prepared raw material (batch raw material) was put into a platinum crucible and heated at 1100 to 1450° C. for 2 to 3 hours to obtain molten glass. The molten glass was stirred for homogenization, fined, and then cast into a molding die that is preheated to an appropriate temperature. The cast glass was heat-treated for about 1 hour near the glass transition temperature Tg, and allowed to cool to room temperature in the furnace. A glass sample was obtained by machining to a size having a length of 40 mm, a width of 10 mm and a thickness of 1.0 mm, and precision polishing (optical polishing) both 40 mm×10 mm surfaces.

[Confirmation of Glass Component Composition]

The content of each glass component of the obtained glass sample was measured by Inductively Coupled Plasma-Atomic Emission Spectrometry (ICP-AES), and it was confirmed that each glass composition was as shown in Table 1.

[Measurement of Optical Properties]

The refractive index nd, the specific gravity and the glass transition temperature Tg of the obtained glass sample were measured. The results are shown in Table 1.

(i) Refractive Index nd

The refractive index nd was measured by the refractive index measuring method of JIS standard JIS B 7071-1.

(ii) Specific Gravity

Specific gravity was measured by the Archimedes' method.

(iii) Glass Transition Temperature Tg

The glass transition temperature Tg was measured using a thermomechanical analyzer (TMA4000S), manufactured by MAC Science Ltd., at a temperature rising rate of 4° C./min.

[Average Linear Expansion Coefficient]

The average linear expansion coefficient was measured according to the Japan Optical Glass Manufacturers' Association standard JOGIS 08-2003 "Measuring method of thermal expansion of optical glass". The diameter of the round bar-shaped sample was 5 mm. The results are shown in Table 1.

[Acid Durability Weight Reduction Rate Da]

According to the Japan Optical Glass Manufacturers' Association standard JOGIS06-2009, the obtained glass sample was made into powdered glass (particle size 425 μm through 600 μm) having a weight corresponding to its specific gravity, was placed into a platinum basket, was soaked in 0.01 mol/L of nitric acid aqueous solution contained in a quartz glass round-bottomed flask and treated in a boiling water bath for 60 minutes, and the weight reduction rate (%) was measured before and after the treatment. The weight loss rate was evaluated by grade. The results are shown in Table 1.

Example 1

Formation of Colored Layer in Samples Having Different Glass Compositions

Example 1-1

A Pt—Pd film was formed into a pattern by sputtering on one surface of the optically polished surface of the glass sample having the glass composition of No. 1 out of the obtained glass sample (current during sputtering was 15 mA, film formation time was 900 sec).

The glass sample on which the Pt—Pd film was formed was heat treated at 400° C. for 5 hours while supplying a forming gas (3 vol % of hydrogen, 97 vol % of nitrogen) as a reduction atmosphere at a flow rate of 0.2 L/min.

Figures 1, 6:
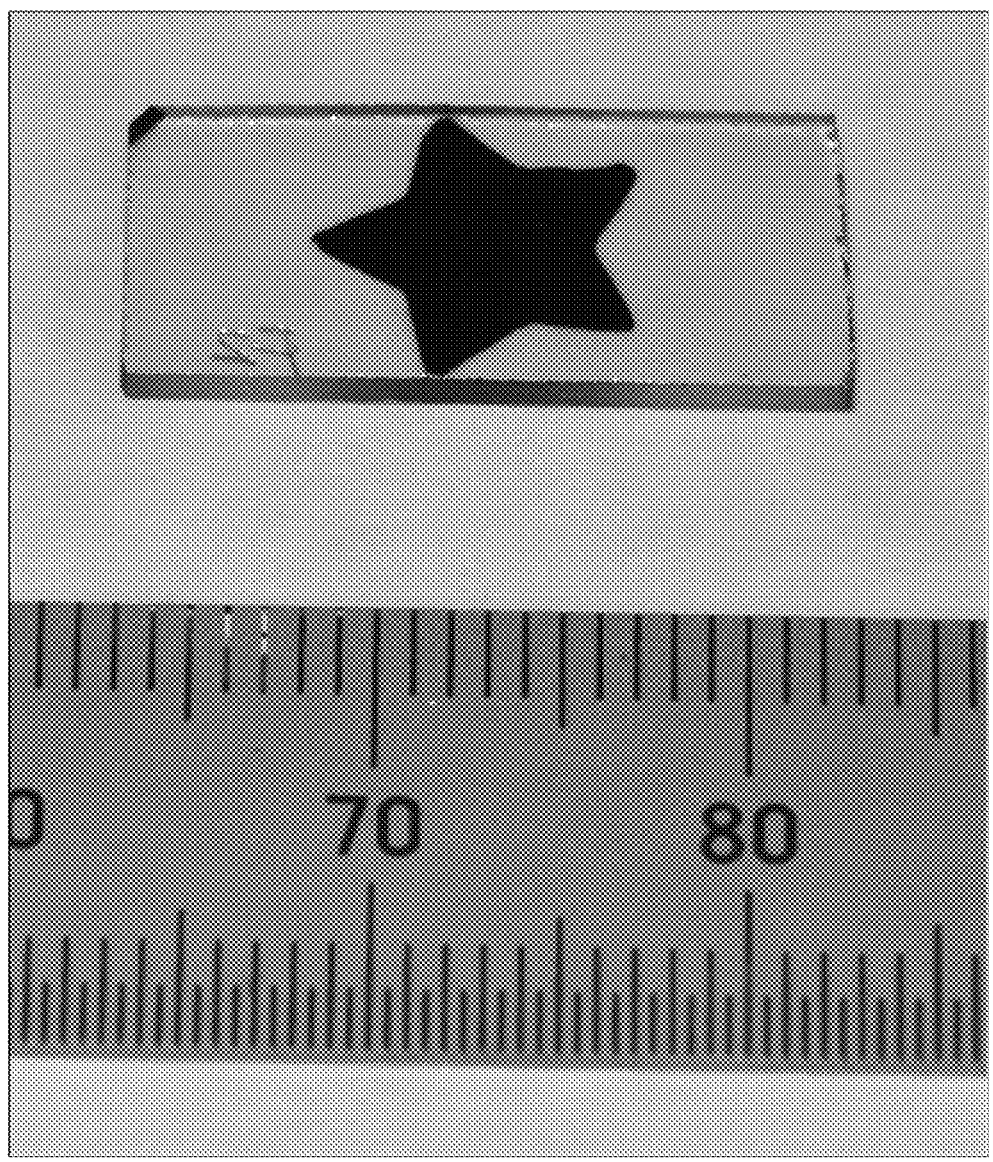
Figures 2, 6:
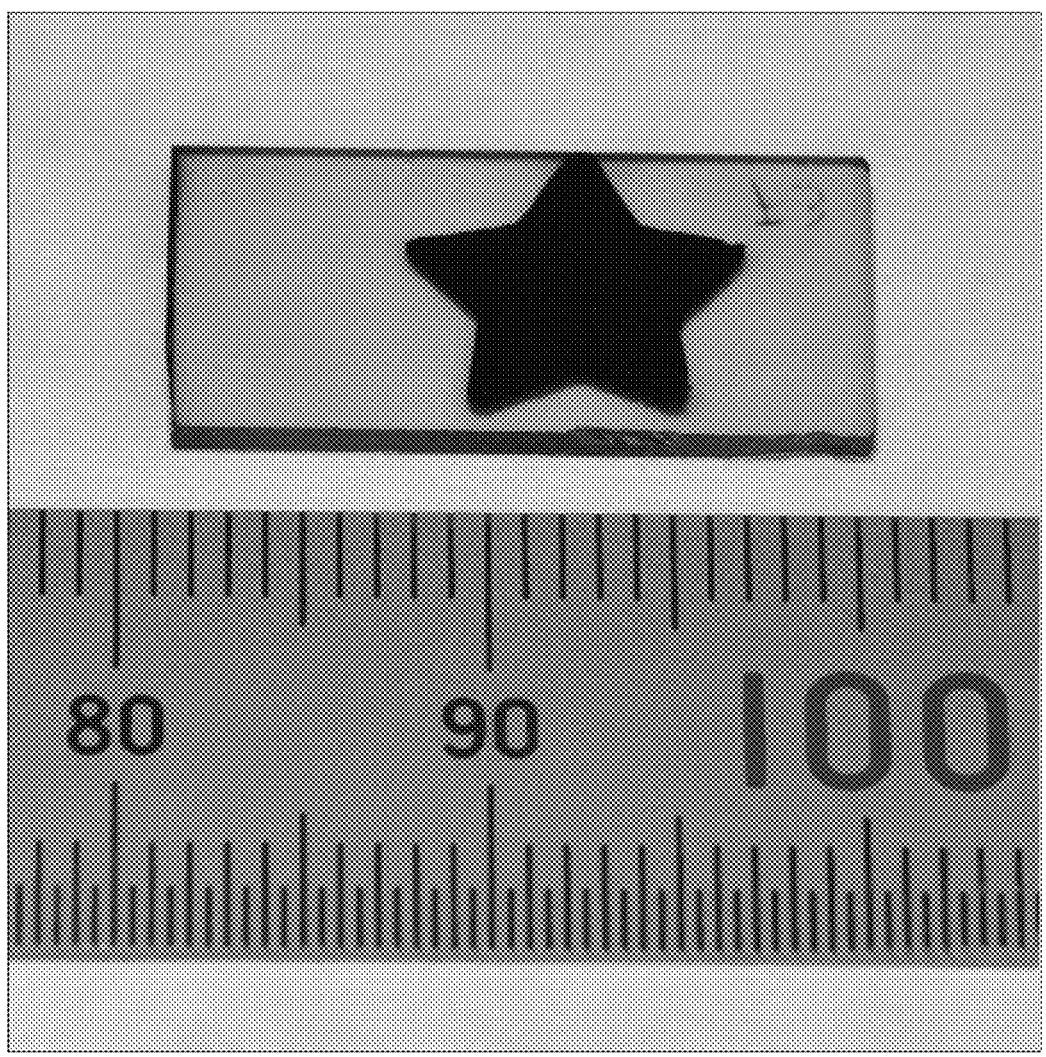

The Pt—Pd film was detached by polishing, and a glass sample having a colored layer was obtained. The obtained glass sample is shown in FIG. 6-1.

[Measurement of Transmittance]

Figures 1, 7:
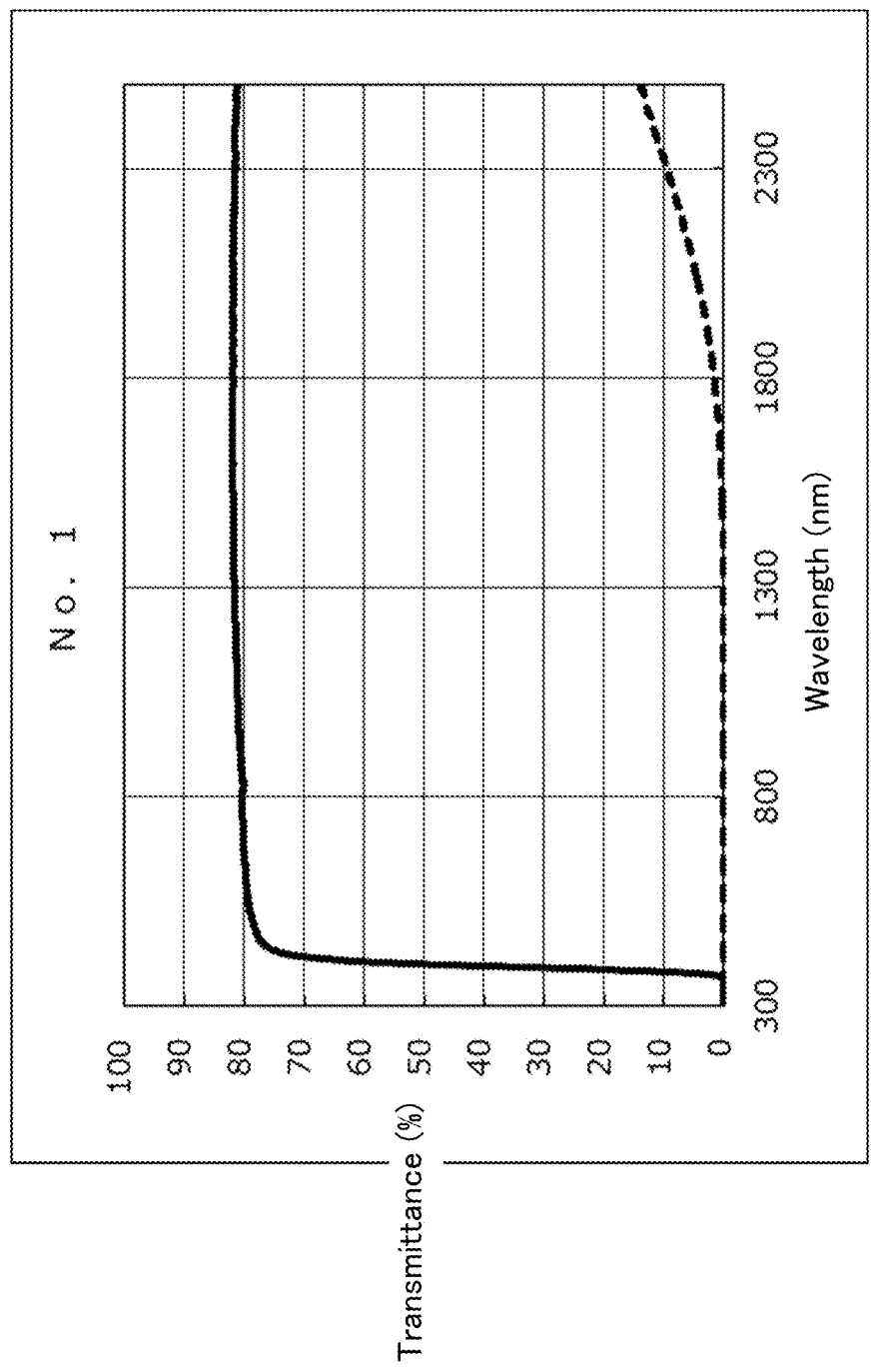
Figures 2, 7:
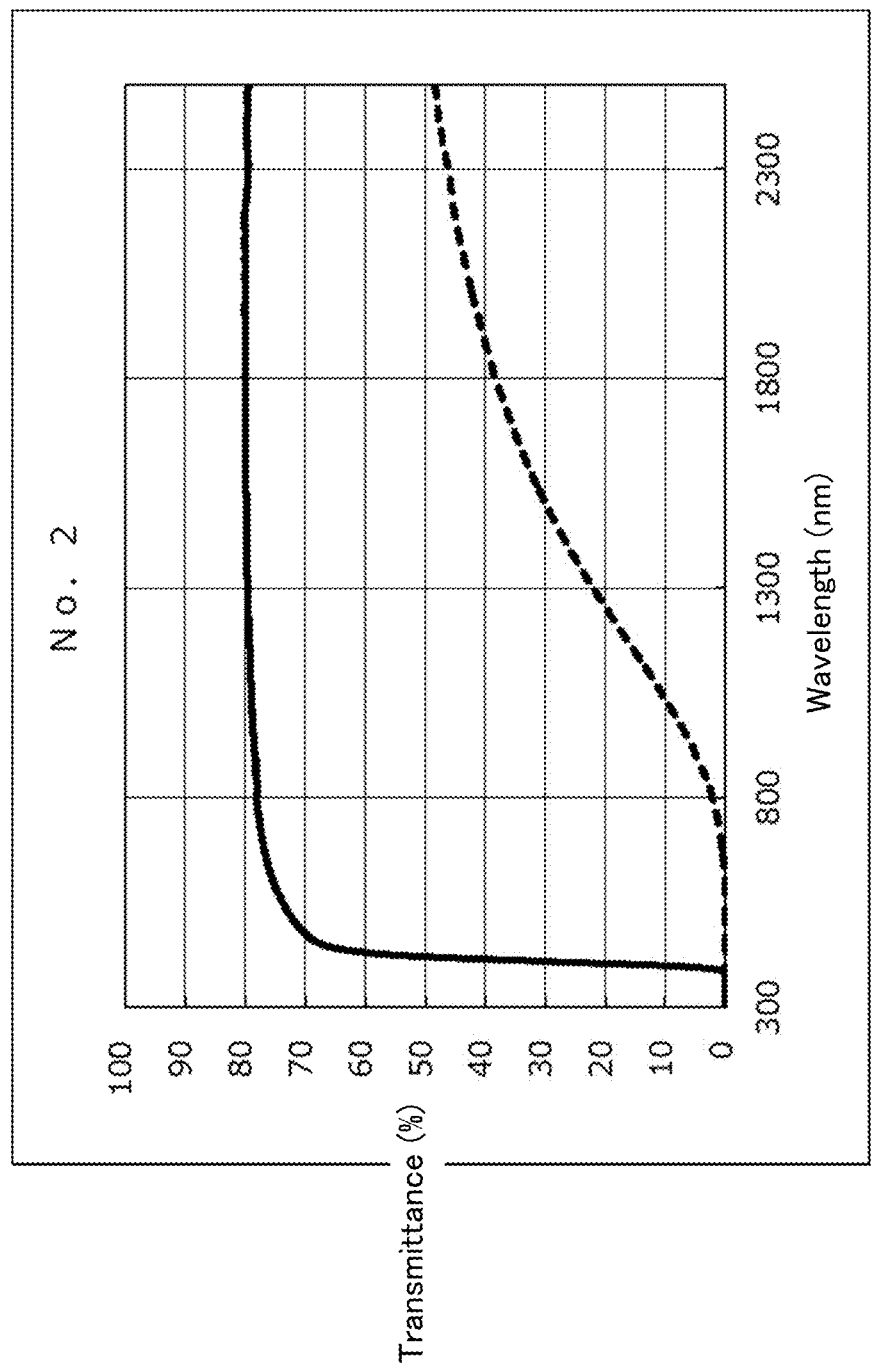
Figures 3, 7:
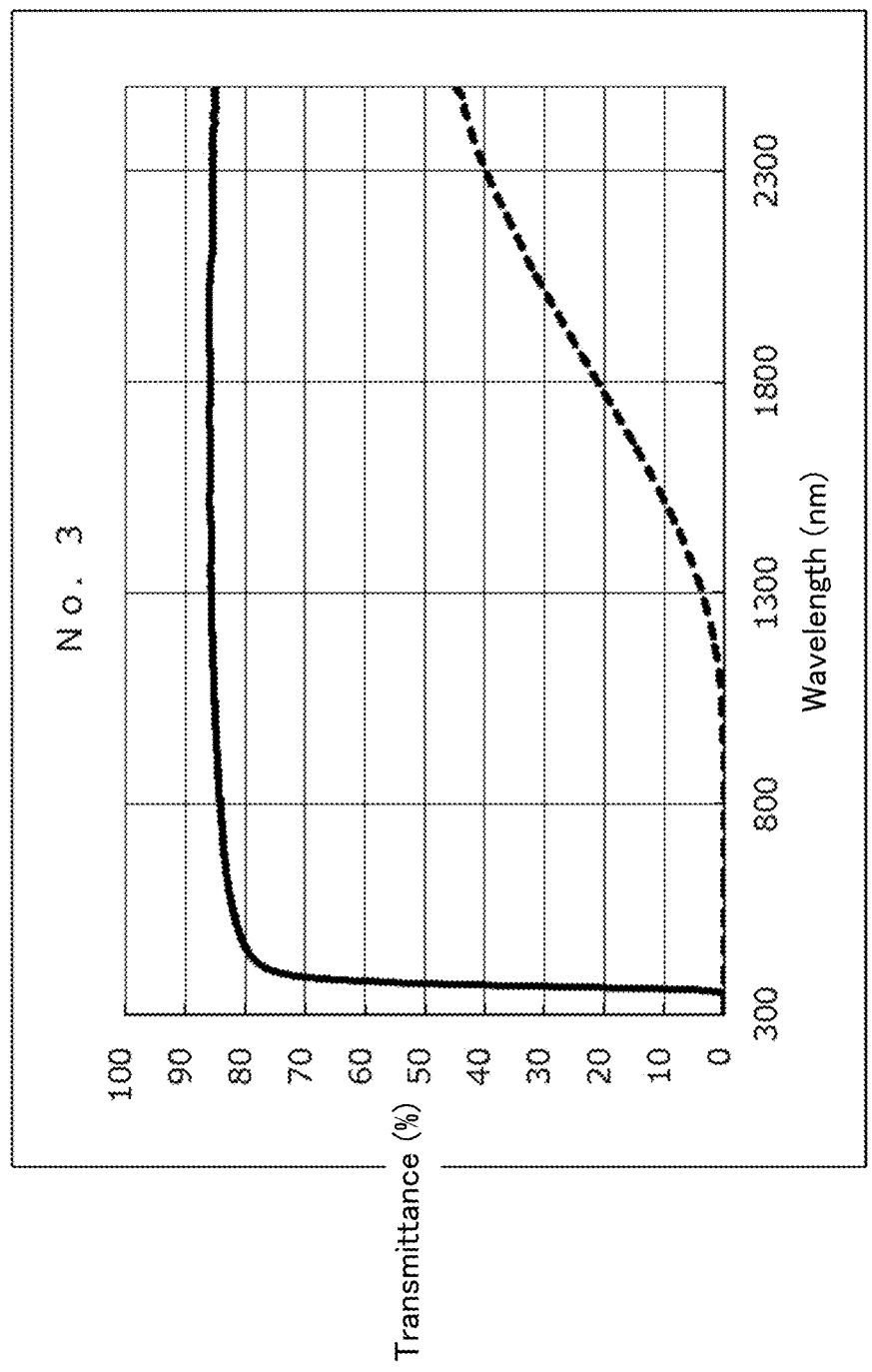

The external transmittance was measured at wavelengths of 300 nm through 2500 nm. The external transmittance is defined as a percentage [transmitted light intensity/incident light intensity×100] of the transmitted light intensity with respect to the incident light intensity when light is incident in the thickness direction of the glass sample. The external transmittance includes the reflection loss of light rays on the sample surface. The results are shown in FIG. 7-1. In FIG. 7-1, the broken line indicates the transmittance of the portion having the colored layer, and the solid line is the transmittance of the same portion before the formation of the colored layer.

[OD Measurement]

The incident light intensity $I_0$ and the transmitted light intensity I were measured for the portion having the colored layer at a wavelength of 1100 nm, and the OD (optical density) was calculated by the below-indicated formula. The OD before forming the colored layer at the same portion was calculated in the same manner. The results are shown in Table 2.

$$OD = -\log_{10}(I/I_0)$$

Example 1-2

A glass sample having a colored layer was obtained in the same manner as in Example 1-1, except that the glass sample having the glass composition of No. 2 was used. The obtained glass sample is shown in FIG. 6-2. The transmittance was measured in the same manner as in Example 1-1, and the results are shown in FIG. 7-2. The OD was measured in the same manner as in Example 1-1. The results are shown in Table 2.

Example 1-3

A glass sample having a colored layer was obtained in the same manner as in Example 1-1, except that the glass sample having the glass composition of No. 3 was heat treated at 430° C. for 9 hours. The transmittance was measured in the same manner as in Example 1-1 and the results are shown in FIG. 7-3. The OD was measured in the same manner as in Example 1-1. The results are shown in Table 2.

TABLE 2

| Glass Sample | Before Formation of Colored Layer | After Formation of Colored Layer |
| --- | --- | --- |
| No. 1 | 0.1 | 4.0 |
| No. 2 | 0.1 | 0.9 |
| No. 3 | 0.1 | 2.1 |

Example 2

Formation of Colored Layers with Metallic Films (Metallic Catalyst Films) Having Different Film Thicknesses Example 2-1

By adjusting the film forming conditions, Pt—Pd films having film thicknesses of 28 nm, 256 nm, 288 nm, and 420 nm were formed on one surface of the optically polished surface of the glass sample having the glass composition of No. 3.

The glass sample on which the Pt—Pd film was formed was heat treated at 400° C. for 4 hours while supplying a forming gas (3 vol % of hydrogen, 97 vol % of nitrogen) as a reduction atmosphere at a flow rate of 0.2 L/min. The Pt—Pd film was detached by polishing, and a glass sample having a colored layer was obtained.

Figures 1, 8:
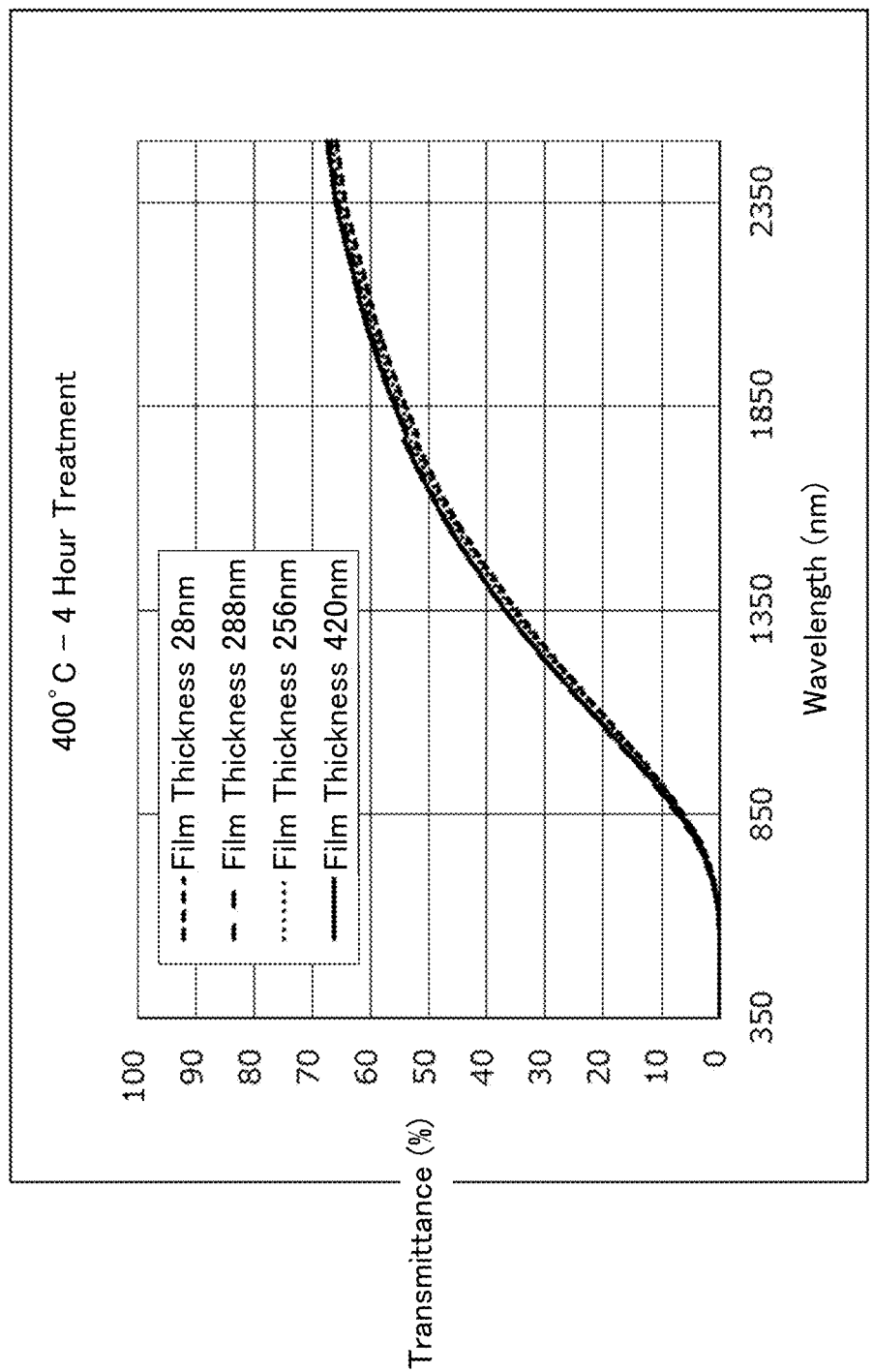
Figures 2, 8:
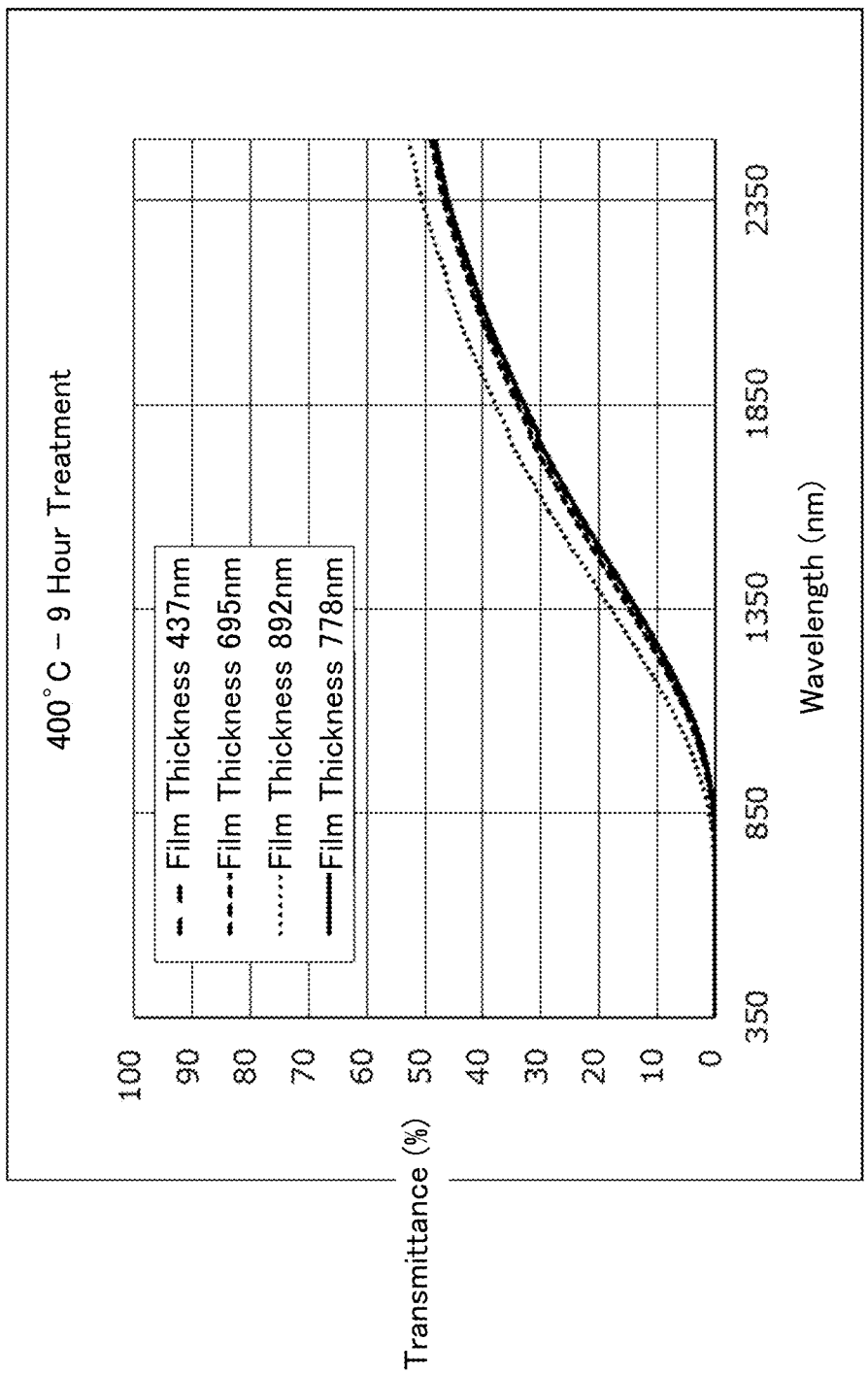
Figure 9:
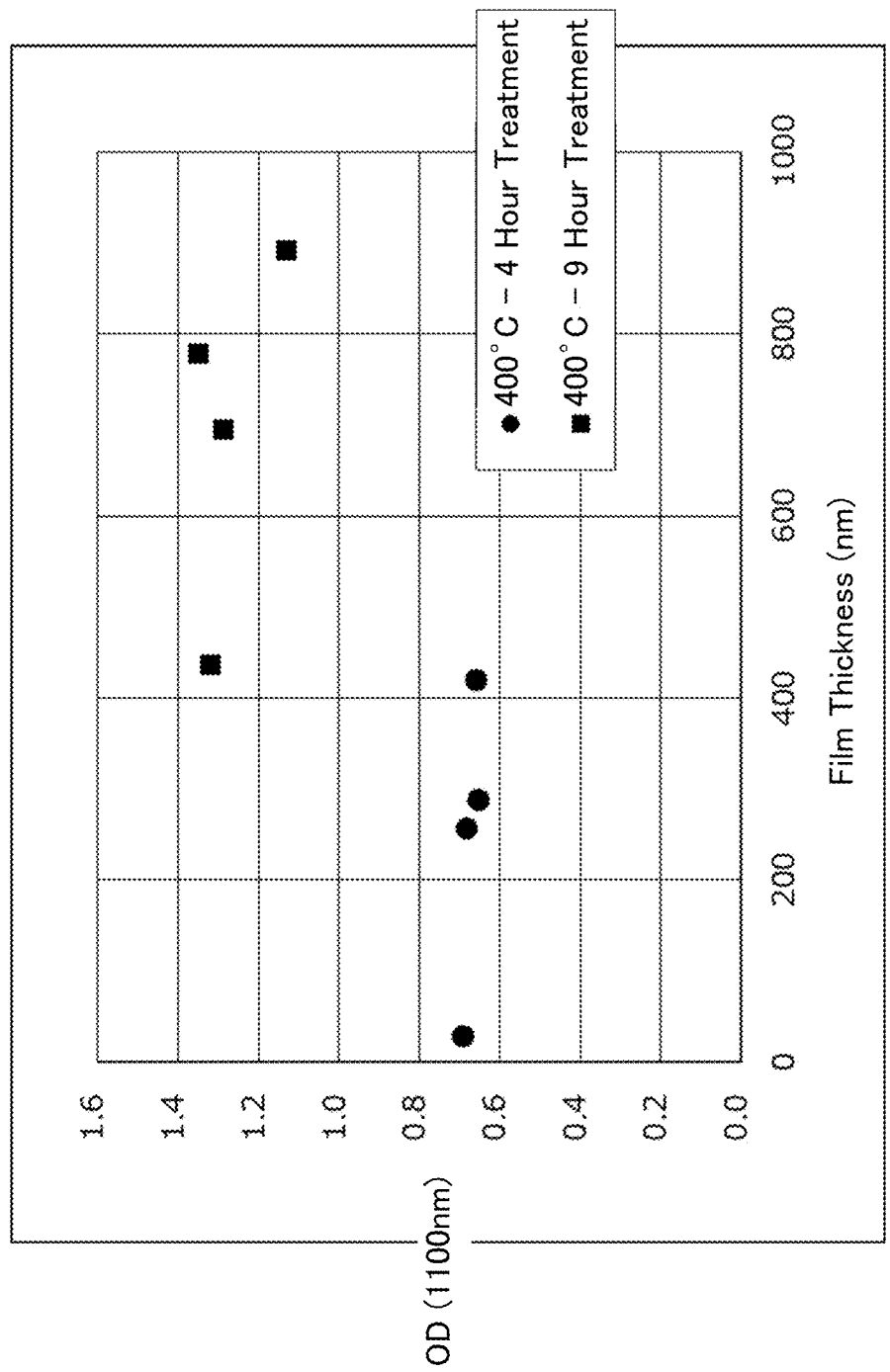
FIG. 9 shows a graph indicating, per heat-treatment time, relationships between the film thickness of metallic films and the OD (optical density) of the samples in Examples 2-1 and 2-2.

The transmittance of the portion having the colored layer was measured in the same manner as in Example 1-1. The relationship between the film thicknesses of the Pt—Pd films and the transmittance is shown in FIG. 8-1. The OD of the portion having the colored layer was measured in the same manner as in Example 1-1. FIG. 9 shows the relationship between the film thicknesses of the Pt—Pd films and the OD.

Example 2-2

By adjusting the film forming conditions, Pt—Pd films having film thicknesses of 437 nm, 695 nm, 778 nm, and 892 nm were formed on one surface of the optically polished surface of the glass sample having the glass composition of No. 3.

The glass sample on which the Pt—Pd film was formed was heat treated at 400° C. for 9 hours while supplying a forming gas (3 vol % of hydrogen, 97 vol % of nitrogen) as a reduction atmosphere at a flow rate of 0.2 L/min. The Pt—Pd film was removed by polishing, and a glass sample having a colored layer was obtained.

The transmittance of the portion having the colored layer was measured in the same manner as in Example 2-1. The relationship between the film thickness of the Pt—Pd films and the transmittance is shown in FIG. 8-2. The OD of the portion having the colored layer was measured in the same manner as in Example 2-1. FIG. 9 shows the relationship between the film thicknesses of the Pt—Pd films and the OD.

It can be understood from FIGS. 8-1, 8-2, and 9 that the transmittance and the OD of the portion having the colored layer depended on the heat treatment time, rather than the thickness of the metallic film (metallic catalyst film).

Example 3

Formation of Colored Layers with Different Types of Metallic Films (Metallic Catalyst Films)

Example 3-1

A glass sample having a colored layer was obtained in the same manner as in Example 1-1, except that Au films having a thickness of 15 nm and a thickness of 300 nm were formed on the optically polished surface of the glass sample having the glass composition of No.3 in place of the Pt—Pd film and was heat treated at 450° C. for 7 hours. The OD of the portion having the colored layer was measured in the same manner as in Example 1-1.

Example 3-2

A glass sample having a colored layer was obtained in the same manner as in Example 1-1, except that the Ag paste was applied to the optically polished surface of the glass sample having the glass composition of No. 3 instead of forming the Pt—Pd film, and heat treatment was performed at 430° C. for 10 hours. The OD was measured in the same manner as in Example 3-1. The results are shown in Table 3.

TABLE 3

|  | Au Film | | Ag Paste |
|---|---|---|---|
| Film Thickness (nm) | 15 | 300 | — |
| OD | 0.69 | 4.22 | 0.642 |

Example 4

Cross-Section Observation of Glass Material with Colored Layer

Example 4-1

A Pt—Pd film was formed on one surface of the optically polished surface of the glass sample having the glass composition of No. 3. Furthermore, a part of the optically polished surface of the same sample was polished using No. 1000 (#1000) abrasive, and a Pt—Pd film was formed also on that part.

Thereafter, forming gas (3 vol % of hydrogen, 97 vol % of nitrogen) was supplied at a flow rate of 0.2 L/min, and heat treatment was performed at 400° C. for 5 hours. The Pt—Pd film was removed by polishing to obtain a glass sample having a colored layer.

The thickness of the colored layer was measured, and the results are shown in Table 4. Table 4 shows a micrograph of a cross section of the portion having a colored layer. In the micrograph of Table 4, the right side is the glass material, and the central black portion is the colored layer.

Example 4-2

An Au film was formed on one surface of the optically polished surfaces of the glass sample having the glass composition of No. 3. A glass sample having a colored layer was obtained in the same manner as in Example 4-1 except that heat treatment was performed at 450° C. for 7 hours.

Table 4 shows a micrograph of the thickness of the colored layer and the cross section of the portion having the colored layer. The OD of the portion having the colored layer was measured in the same manner as in Example 1-1. The results are shown in Table 4.

Example 4-3

An Au film was formed on one surface of the optically polished surfaces of the glass sample having the glass composition of No. 3. A glass sample having a colored layer was obtained in the same manner as in Example 4-2, except that the film formation time of the Au film was longer than that in Example 4-2.

Table 4 shows a micrograph of the thickness of the colored layer and the cross section of the portion having the colored layer. The OD was measured in the same manner as in Example 4-2. The results are shown in Table 4.

Example 4-4

A glass sample having a colored layer was obtained in the same manner as in Example 4-2 except that Pt—Pd films were formed on both surfaces of the optically polished surfaces of the glass sample having the glass composition of No. 3.

Table 4 shows a micrograph of the thickness of the colored layer and the cross section of the portion having the colored layer. The OD was measured in the same manner as in Example 4-2. The results are shown in Table 4.

TABLE 4

| Example | 4-1 | 4-2 | 4-3 | 4-4 |
|---|---|---|---|---|
| Color Layer Thickness (μm) | 46 (#1000 Polished Surface) 42 (Optically polished Surface) | 29 | 84 | 109 |
| OD (1100 nm) | — | 0.69 | 4.22 | ≥5 |

The surface polished using No. 1000 (#1000) abrasive has a greater surface roughness than the optically polished surface. It can be understood from Table 4 that the thickness of the colored layer formed varies depending on the surface roughness of the glass.

Example 5

Formation of a Colored Layer Having a Dot Pattern

A Pt—Pd film was formed in a dot pattern on the optically polished surface of the glass sample having the glass composition of No. 3; the details of which are as follows.

A metal plate was prepared that has a high level of flatness that is enough to cover the glass surface and has dot-patterned openings. The metal plate was adhered to the optically polished surface of the glass sample, and a Pt—Pd film was formed in the dot pattern openings.

Figure 10:
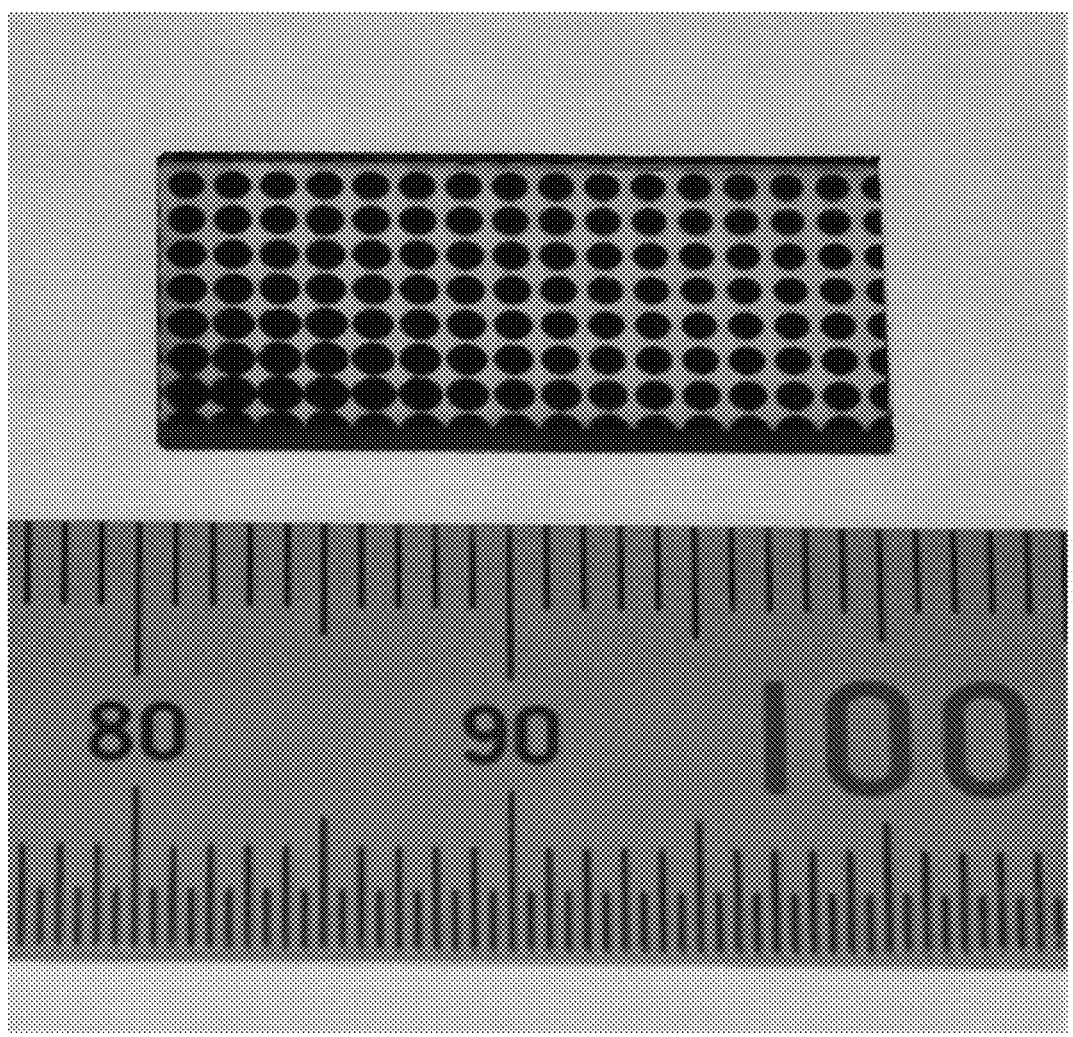
FIG. 10 is an image showing a sample of Example 5, and a ruler for reference.

Thereafter, the metal plate was removed, and the glass sample having the Pt—Pd film formed in the dot patterns was heat-treated in the same manner as in Example 1-3 to obtain a glass sample having a colored layer. The obtained glass sample is shown in FIG. 10.

Example 6

Change in Transmittance Due to Removal of Colored Layer

A glass sample having a colored layer was obtained in the same manner as in Example 1-3, except that the glass sample having the glass composition of No.3 was machined to have a thickness of 750 μm.

The cross section of the portion having the colored layer was observed with a microscope, and it was confirmed that the thickness of the colored layer was 110 μm. The OD of the portion having the colored layer was measured in the same manner as in Example 1-1. The results are shown in Table 5.

The obtained glass sample was polished from the surface having the colored layer so that the thickness of the glass sample was 660 μm, and the OD was measured for the same portion. The results are shown in Table 5.

Similarly, the glass sample was polished so that the thickness was 610 μm, 500 μm, and 380 μm, and the OD was measured for the same portion. Furthermore, the amount of change from the OD before polishing (without a polishing margin) was calculated. The OD results are shown in Table 5.

TABLE 5

| Thickness (μm) | 750 | 660 | 610 | 500 | 380 |
|---|---|---|---|---|---|
| Polishing Margin (μm) | 0 | 90 | 140 | 250 | 370 |
| OD (1100 nm) | 1.52 | 0.86 | 0.06 | 0.08 | 0.02 |
| Change in OD (1100 nm) | — | −0.66 | −1.45 | −1.44 | −1.49 |

According to Table 5, when the polishing margin of the glass sample exceeds 140 μm, the amount of change in OD becomes small. When the colored layer is removed by polishing, the glass sample has only a non-colored portion (a transparent area without coloration). Therefore, almost no change in the OD occurs even if the thickness is further reduced by polishing. Namely, the thickness of the colored layer of the glass sample is estimated to be more than 90 μm and less than 140 μm from the result of the amount of change in the OD due to polishing. This result agrees with the thickness (110 μm) of the colored layer based on the microscopic observation of the cross section. It should be noted that the increase/decrease in OD in the polishing margin range of 140 μm to 370 μm is negligible, and is considered to be within measurement error.

<<Specific Examples of Optical Element with Colored Layer on Glass Body>>

As shown in FIGS. 1 and 2, the optical element of the present embodiment has a glass body 1, and a colored layer 2 located inside the glass body 1 and positioned at an optical function surface of the optical element. The colored layer 2 is located from the surface of the glass body 1 to the inside thereof. Alternatively, the colored layer 2 may be located inside the glass body 1 instead of being located on the surface of the glass body 1.

By selectively forming the colored layer 2 inside the glass body 1 and at the light-shielding part of the optical element, it is possible to exhibit a desired optical performance by shielding light in the portion where the colored layer 2 is present and transmitting light through the portion where the colored layer 2 is not present, as shown in FIG. 3 (FIG. 3-1, FIG. 3-2) and FIG. 4. Thereupon, due to light that reflects from an inner surface of a portion without the colored layer 2 being absorbed by the colored layer 2, a favorable optical element that suppresses the occurrence of stray light can be achieved. Furthermore, the colored layer 2 can exhibit a desired optical function by functioning in cooperation with a layer other than a colored layer 2 (such as, e.g., an adjacent light-transmissive layer).

The thickness of the colored layer 2 extending from the surface of the glass body 1 to the inside thereof is preferably 1 μm to 300 μm, more preferably 20 μm to 200 μm, and more preferably 30 μm to 150 μm. By satisfying this condition, the optical element can function favorably as an optical element including light shielding capability. If the lower limit of this condition is exceeded (if the thickness of the colored layer 2 is less than 1 μm), the light shielding capability of the colored layer 2 might not be sufficient. If the upper limit of this condition is exceeded (if the thickness of the colored layer 2 is larger than 300 μm), there is a risk that the colored layer extending toward the inside of the glass may shield off effective light rays incident at an oblique angle relative to the optical element depending on the part of the optical element forming the colored layer, so that the optical element would not sufficiently function as an optical element.

It is desirable for the colored layer 2 to have an optical density OD of 2.0 or more at a wavelength of 750 nm, and it is more preferable to have an optical density OD of 3.0 or more at a wavelength of 750 nm. In a wavelength range from the visible light range to the infrared range, the spectral transmittance of the colored layer 2 shows a tendency to increase as the wavelength becomes longer. When indicated as optical density OD, this tendency of the spectral transmittance is synonymous with the tendency for the optical density OD to decrease as the wavelength becomes longer. By satisfying the above conditions, the function of the optical element as an optical element including light shielding capability in the visible light region can be favorably exhibited. If the lower limit of this condition is exceeded (if the optical density OD of the colored layer 2 is less than 2.0 at a wavelength of 750 nm), the optical element (including light shielding capability) would not sufficiently function as an optical element.

<Applying the Optical Element to a Parallax Barrier>

Figure 11:
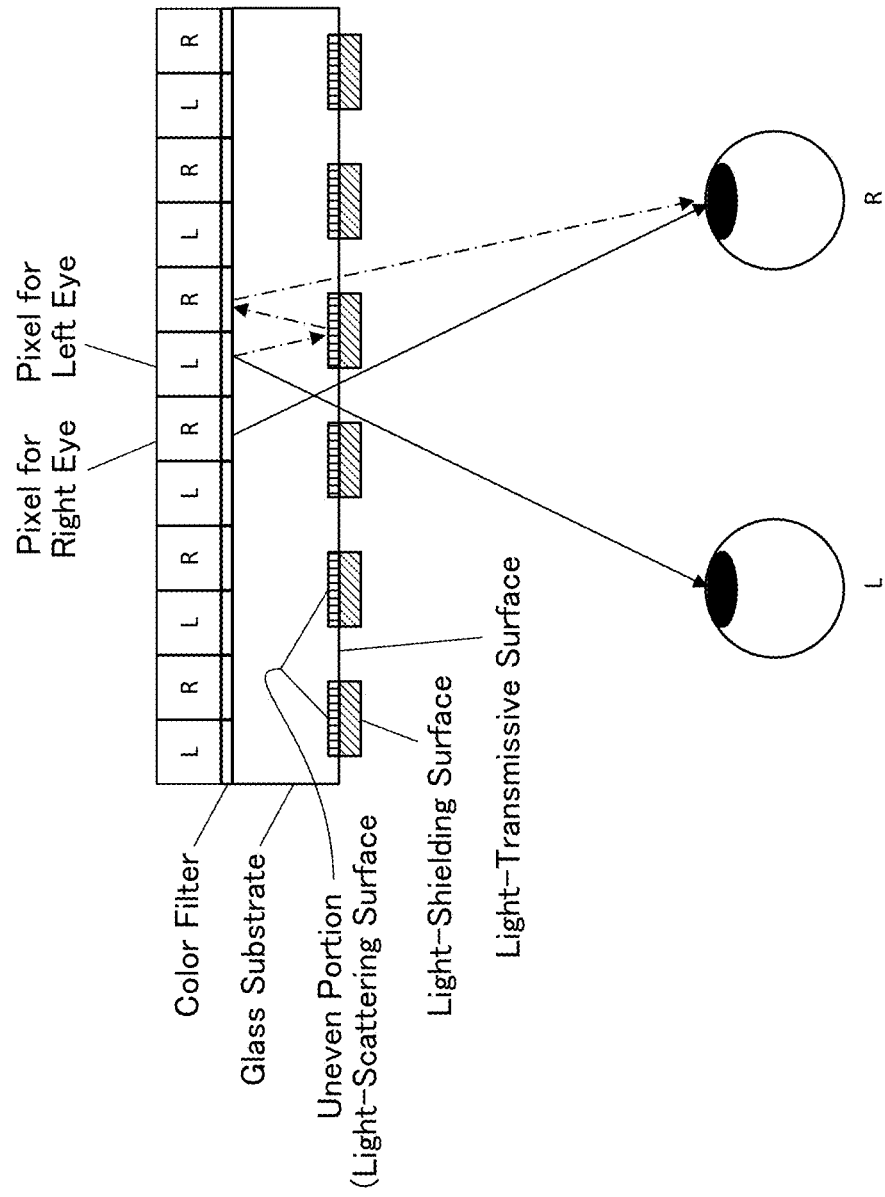
FIG. 11 is an illustrative view for describing a technical problem that exists in a parallax barrier of the related art.
Figure 12:
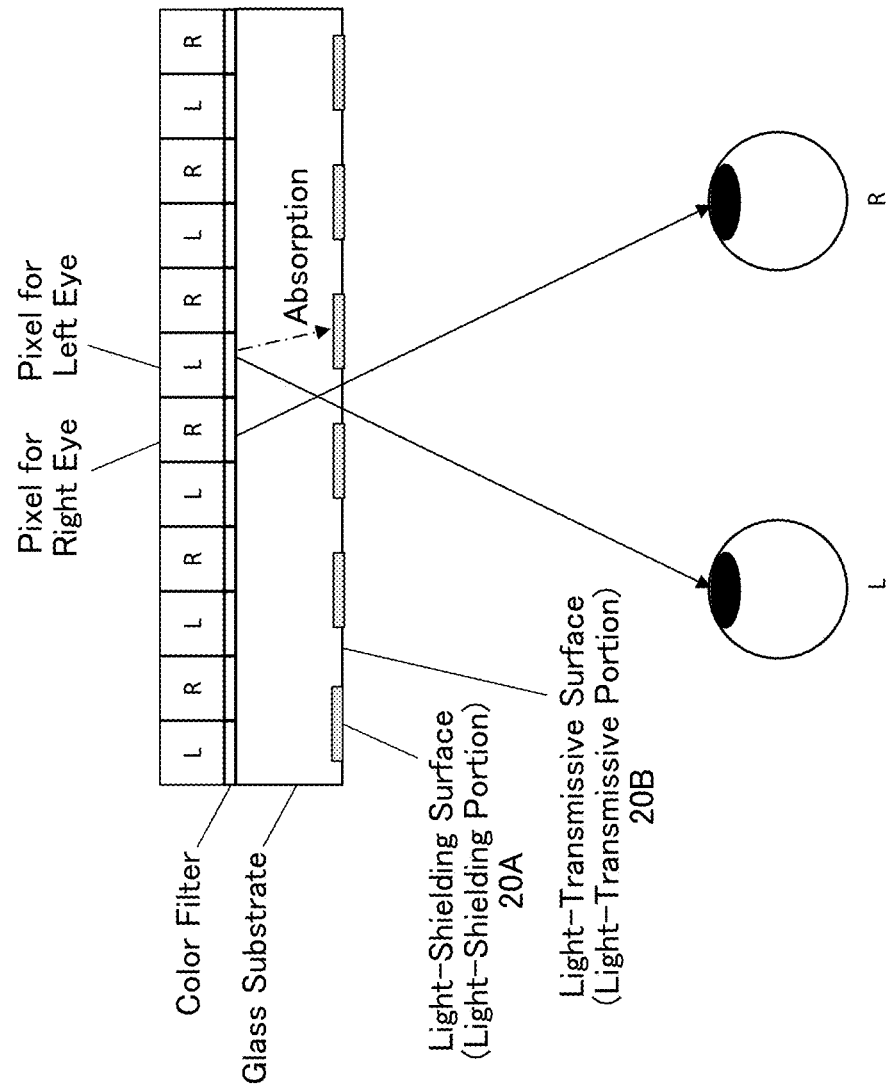
FIG. 12 is an illustrative view for describing the superiority of a parallax barrier of the present disclosure.

A case where the optical element of the present disclosure is applied to a parallax barrier (optical device) will be described with reference to FIGS. 11 and 12. FIG. 11 is an illustrative view for describing a technical problem that exists in a parallax barrier of the related art (e.g., Patent Literature No. 1), and FIG. 12 is an illustrative view for describing the superiority of a parallax barrier of the present disclosure.

An example of an optical element that serves to function as transmission slits by having a pattern of light-transmissive portions and light-shielding portions is a parallax barrier for use in a display device that enables stereoscopic viewing without the need for special glasses, such as polarized glasses. The parallax barrier is an optical element including a substrate such as glass, etc., provided thereon with a large number of, e.g., strip-shaped light-shielding portions, and by providing such a parallax barrier in a display device such as, e.g., a liquid crystal display (LCD), an image on the display for the right eye and an image on the display for the left eye are separated; only the left-eye image (left-eye pixels L) is made visible to the left eye of the observer (user) and only the right-eye image (right-eye pixels R) is made visible to the right eye of the observer (user), thereby enabling a stereoscopic view.

Generally, light-shielding portions of a parallax barrier are formed by the vapor deposition or printing, etc., of a metallic material such as chrome or aluminum, or a black resin material, onto a glass substrate. Since it is typical for a glass substrate to be processed to have a high smoothness, in the case of a liquid crystal display device, light exiting from the LCD panel thereof and transmitting through color filters internally reflects at portions facing the light-shielding portions of the parallax barrier on the glass substrate. In particular, the inner surface of the glass substrate has a higher reflectance and a more prominent internal reflection at the portions facing the light-shielding portions of the parallax barrier due to the difference in refractive index with respect to the formed light-shielding portions. Some of the light that is subjected to internal reflection, and then further subjected to internal reflection at the surface of the glass substrate to which the glass filters are formed, externally escapes via transmissive portions through which part of such light is not supposed to pass. Such a phenomenon is referred to as "crosstalk", and causes insufficient separation of the parallax image, so that the quality of the stereoscopic image is deteriorated.

In Patent Literature No. 1, in order to suppress crosstalk, it is proposed that uneven portions (recesses and protrusions) that produce light-scattering characteristics be provided on a surface that forms color filters and at positions opposing light-shielding portions of a parallax barrier, so that light that would cause crosstalk and is incident on these surfaces (portions) is suppressed by being scattered, thereby providing a high-quality stereoscopic image. In the example shown in FIG. 11, a plurality of light-shielding portions protrudes downwardly from the undersurface of the glass substrate. A plurality of uneven portions (provided with recesses and protrusions) is provided on top of the plurality of light-shielding portions (the plurality of light-shielding portions corresponds to the plurality of uneven portions). Furthermore, out of the undersurface of the glass substrate, a plurality of light-transmissive portions are respectively formed at the portions in which the plurality of light-shielding portions of the parallax barrier are not formed (between the plurality of light-shielding portions). However, even if such uneven portions (provided with recesses and protrusions) having light-scattering characteristics are provided in part of the light path that causes crosstalk, since light scattering occurs, part of the scattered light sometimes externally escapes out through transmissive portions through which part of such light is not supposed to pass (refer to the single-dot chain line in FIG. 11), so that such a proposal cannot be said to exhibit a very high suppression of crosstalk.

In the present disclosure, upon considering the above-discussed problems relating to Patent Literature No.1 as an important technical challenge, the optical element is provided with a parallax barrier, in which a plurality of colored layers forms a plurality of light-shielding surfaces (light-shielding portions) 20A of the parallax barrier. More specifically, in the present embodiment, as shown in FIG. 12, a plurality of colored layers extending from the surface of a glass substrate toward the inside thereof are provided; the plurality of colored layers forming the plurality of light-shielding surfaces 20A of the parallax barrier. Accordingly, likewise with the disclosure in Patent Literature No. 1, a light-shielding function, which is the original objective of the parallax barrier, can be achieved. Furthermore, a plurality of light-transmissive surfaces (light-transmissive portions) 20B are provided between the light-shielding surfaces (light-shielding portions) 20A, respectively.

Furthermore, since the colored layers (light-shielding surfaces) of the present disclosure possess a light absorbing function, in addition to light (from a light source) that is directly incident onto the colored layers, almost all of the light that first is internally reflected by the light-transmissive surfaces at the exit surface of the glass substrate, thereafter returns to the incident surface of the glass substrate, thereafter is internally reflected by the incident surface, and thereafter arrives at the exit surface again, is absorbed by the colored layers (refer to the single-dot chain line in FIG. 12). Accordingly, external escaping of light can be reduced, thereby effectively suppressing crosstalk.

Furthermore, there is almost no difference in the refractive index of the colored layers (light-shielding surfaces/light-shielding portions) of the present disclosure and the refractive index of the portion of the glass substrate that is not colored. Therefore, reflection light rays do not occur at the interfacial boundaries between the colored layers and the glass substrate, and since energy of the light incident on the colored layers is absorbed through the process of proceeding through the colored layers before reaching the interfacial boundary between the colored layers and air, almost no stray light occurs.

Furthermore, if an uneven portion (recesses and protrusions) having a light-scattering effect is provided, such as disclosed in Patent Literature No.1, there is the extra step needed to formed the recesses and protrusions via a known process; whereas, in the case of the present disclosure, such a process can be omitted.

Although in the present disclosure a striped shape is given as an example of the pattern of the light-shielding surfaces, the widths of the light-shielding surfaces and the widths of the light-transmissive surfaces may be set to appropriate dimensions for a desired stereoscopic effect (number of viewpoints of the stereoscopic image, viewing angle, etc.) based on known technology, and is not limited to the present disclosure (FIG. 12).

In addition, in order to reduce the occurrence of a moiré effect (an interference pattern between the light-shielding pattern of the parallax barrier and the black matrix (a light-shielding member for preventing color mixing at the interfaces of the color filter pixels) of the LCD panel), the light-shielding pattern is not limited to the vertical stripes and may incline at a specified angle based on known technology. Furthermore, the light-shielding pattern is not limited to a pattern consisting of only straight lines, but can also be a pattern in which the light-shielding surfaces are connected in a stepped pattern or a pattern of connecting arcs, based on known technology.

<Applying the Optical Element to a Zone Plate>

Figure 13:
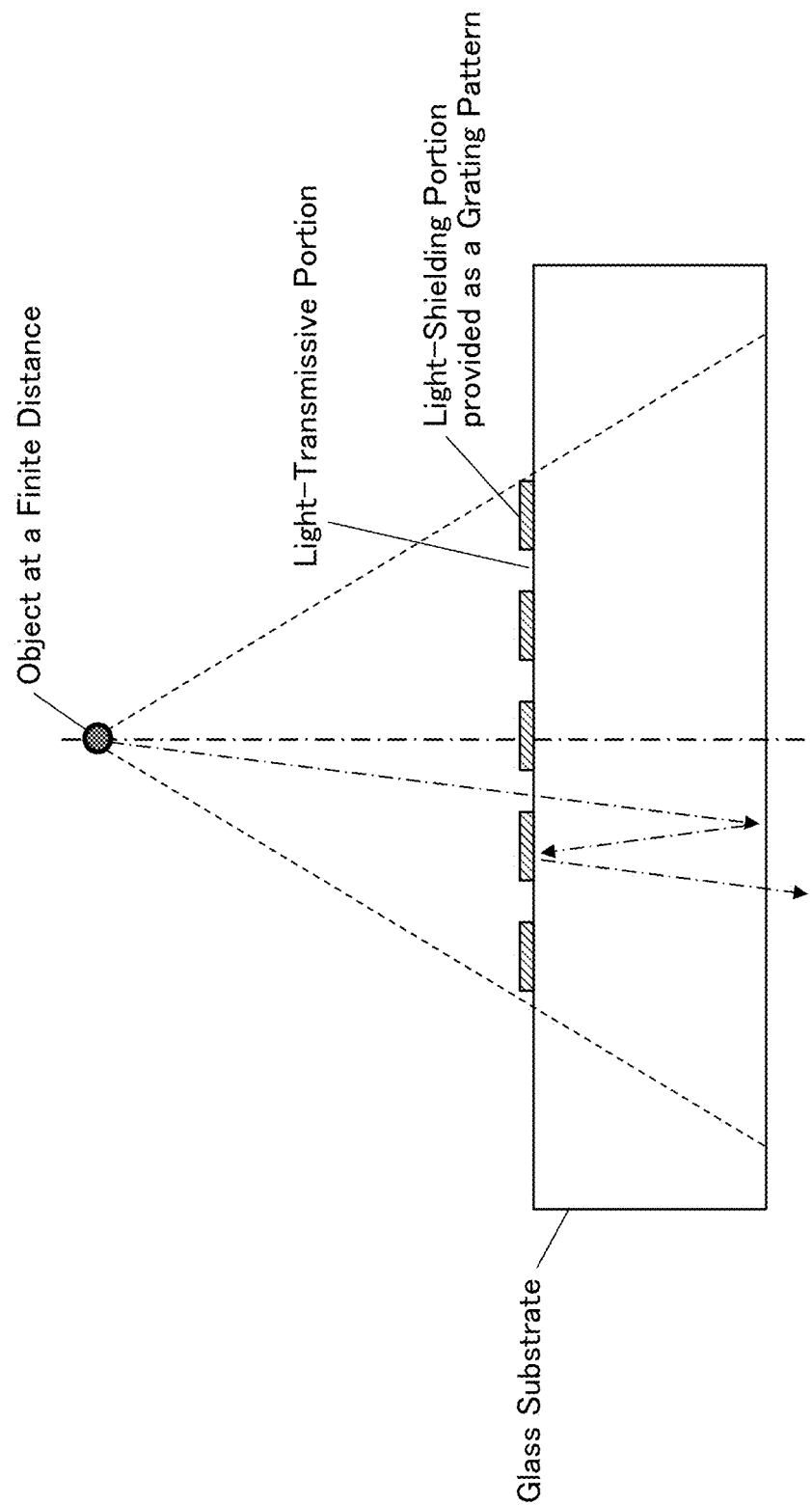
FIG. 13 is an illustrative view for describing a technical problem that exists in a zone plate of the related art.
Figure 14:
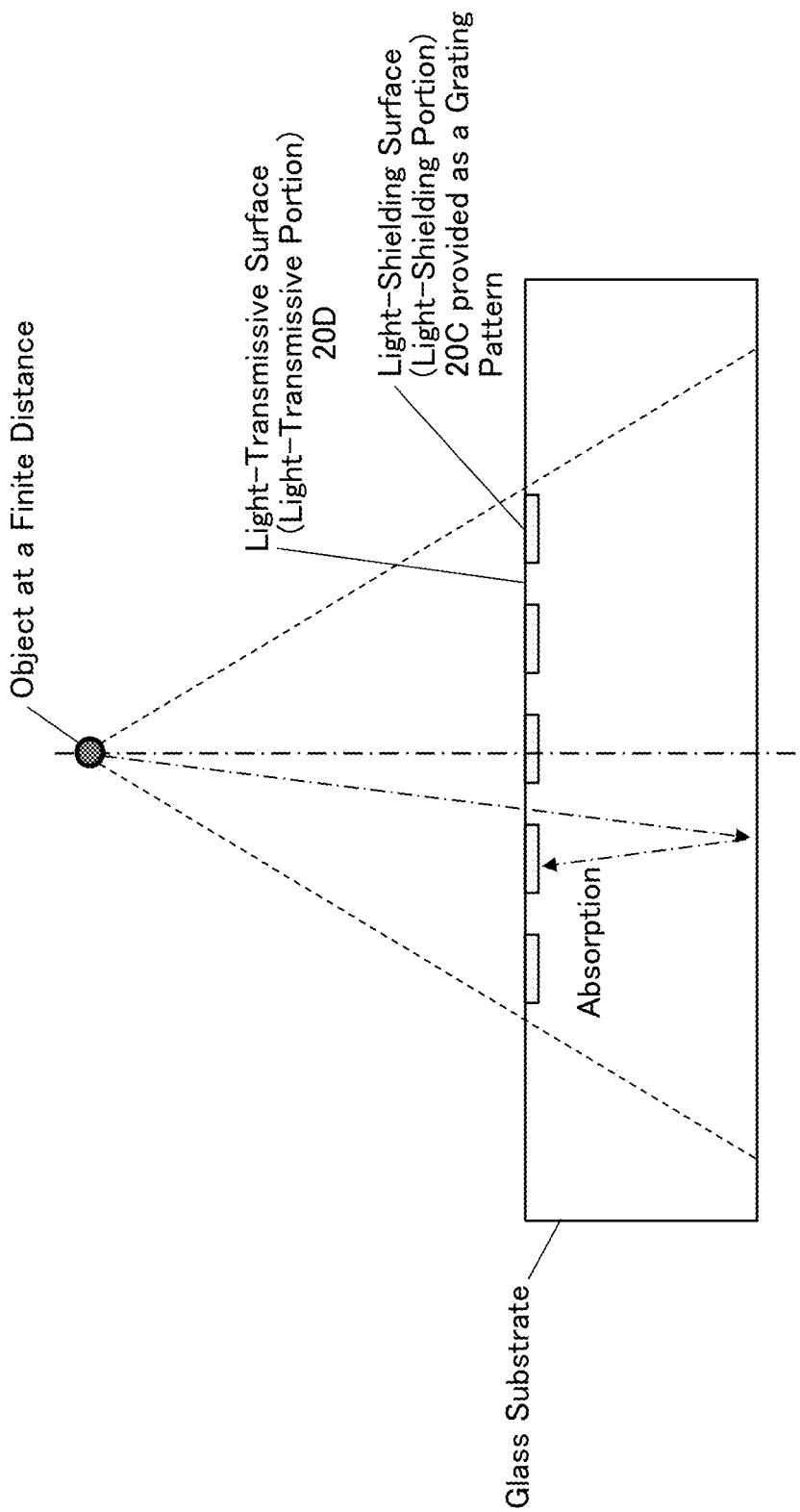
FIG. 14 is an illustrative view for describing the superiority of a zone plate of the present disclosure.

A case where the optical element of the present disclosure is applied to a zone plate (optical device) will be described with reference to FIGS. 13 and 14. FIG. 13 is an illustrative view for describing a technical problem that exists in a zone plate of the related art (e.g., Patent Literature No. 2), and FIG. 14 is an illustrative view for describing the superiority of a zone plate of the present disclosure.

A zone plate is known as an optical element with a light-shielding pattern formed on a transparent substrate (e.g., glass substrate). A zone plate is an optical element having a concentric pattern in which distance between the light-transmissive portions and the light-shielding portions change regularly in accordance with the radius from the center. A zone plate is sometimes used as a pattern mask in a system in which the pattern mask is positioned in front of an image sensor, a photograph is taken of the shadow of the pattern mask imaged onto the image sensor by incident light from an object, and a formed object image is obtained by numerical calculation.

For example, in Patent Literature No. 2, an imaging apparatus is proposed that can estimate distances by providing a zone plate, as a photographic pattern, placed in front of an image sensor, photographing the transmitted light that has had its light intensity modulated by the pattern of the zone plate, and calculating a mutual correlation function with respect to a development pattern. As shown in FIG. 13, when capturing an image of an object at a finite distance, a lattice pattern is projected via a concentric pattern (pattern mask) formed by light-shielding portions, which form the lattice pattern.

The zone plate, which is used as a photographic pattern, is formed by sputtering, vapor deposition or printing, etc., of a metallic material such as chrome or aluminum, or a black resin material, to form a pattern shape onto a transparent substrate such as glass, etc. In the example shown in FIG. 13, a plurality of light-shielding portions, which provide a lattice pattern of the zone plate, project upward from the upper surface of the glass substrate. A plurality of light-transmissive portions are formed between the plurality of light-shielding portions, respectively.

In an imaging apparatus that uses such a zone plate, if reflection light that occurs at an inner surface of the glass substrate externally escapes, a phenomenon occurs in which the image of the pattern-mask shadow that is supposed to be formed changes, or the contrast thereof is reduced, etc., so that there is risk of causing adverse influence, such as occurrence of error, on the distance estimation. The incident light from an object transmits through the light-transmissive portions of the zone plate, and part of this light is reflected from the inner surface on the image sensor side of the glass substrate. However, there is a risk that the light that reflects from the inner surface on the image sensor side of the glass substrate is further partially reflected at the inner surface of the surface of the glass substance on which the lattice pattern is formed, and thereafter transmits through the image sensor side of the zone plate and arrive at the image sensor (refer to the single-dot chain line in FIG. 13).

In the present disclosure, upon considering the above-discussed problems relating to Patent Literature No.2 as an important technical challenge, the optical element is provided with a zone plate, in which a plurality of colored layers forms a plurality of light-shielding surfaces (light-shielding portions) 20C of the zone plate. More specifically, in the present embodiment, as shown in FIG. 14, a plurality of colored layers extending from the surface of a glass substrate to the inside thereof are provided; the plurality of colored layers respectively forms the plurality of light-shielding surfaces 20C of the zone plate. Accordingly, likewise with the disclosure in Patent Literature No. 2, a light-shielding function, which is the original objective of the zone plate, can be achieved. Furthermore, a plurality of light-transmissive surfaces (light-transmissive portions) 20C are provided between the light-shielding surfaces (light-shielding portions) 20D, respectively.

Furthermore, since the colored layers (light-shielding surfaces) of the present disclosure possess a light absorbing function, almost all of the light (from a light source) that first is reflected by the exit surface of the glass substrate, thereafter returns to the incident surface of the glass substrate, is reflected by the incident surface, and arrives at the exit surface again, is absorbed by the colored layers. Accordingly, external escaping of light can be reduced (refer to the single-dot chain line in FIG. 14).

Furthermore, there is almost no difference in the refractive index of the colored layers (light-shielding surfaces/light-shielding portions) of the present disclosure and the refractive index of the portion of the glass substrate that is not colored. Therefore, reflection light rays do not occur at the interfacial boundaries between the colored layers and the glass substrate, and since energy of the light incident on the colored layers is absorbed through the process of proceeding through the colored layers before reaching the interfacial boundary between the colored layers and air, almost no stray light occurs.

Although the pattern of the light-shielding surfaces (light-shielding portions) of the zone plate can have, e.g., a concentric shape, the pattern shape and/or the widths of the light-shielding surfaces and the widths of the light-transmissive surfaces may be set to dimensions appropriate for reproducing an image based on known technology, and is not limited to the present disclosure (FIG. 14).

<Applying the Optical Element to a Glass Scale of an Optical Encoder>

A case where the optical element of the present disclosure is applied to a glass scale (code pattern) of an optical encoder will be described with reference to FIGS. 15 and 16. FIGS. 15A and 15B each show an illustrative view for describing a technical problem that exists in a glass scale of an optical encoder of the related art (e.g., Patent Literature No. 3), and FIGS. 16A and 16B each show an illustrative view for describing the superiority of a glass scale of an optical encoder of the present disclosure.

A glass scale for an optical encoder is known in the art as an optical element in which a light-shielding pattern is formed on a transparent substrate (e.g., a glass substrate). An encoder is a device which detects a mechanical position and rotation, and an optical encoder is mainly configured of a light-emitting element, a glass scale and a light-receiving element, etc. The glass scale is a component that shields (blocks off) and transmits light. Light emitted from the light-emitting element is shielded by or transmits through the glass scale, and a position or rotation can be measured by detecting, using the light-receiving element, light that has transmitted through the glass scale or light that has reflected off the glass scale. When the glass scale displaces in the length-measuring direction, a contrast pattern of the light that forms on the light-receiving element moves, and a signal(s) is output from the light-receiving element in accordance with the contrast pattern.

The glass scale is an optical element in which a large number of light-shielding portions and light-transmissive portions are formed on a substrate such as glass, and has the shape of a circular disk or is rectangular in shape. The light-shielding portions of the glass scale are formed by the etching, vapor deposition or printing, etc., of a metallic material such as chrome or aluminum, or a black resin material, onto a glass substrate. In the examples shown in FIGS. 15A and 15B, a plurality of light-shielding portions of a glass scale project downwards from the undersurface of a glass substrate. A plurality of light-transmissive portions is provided between the plurality of light-shielding portions, respectively.

Figure 15A:
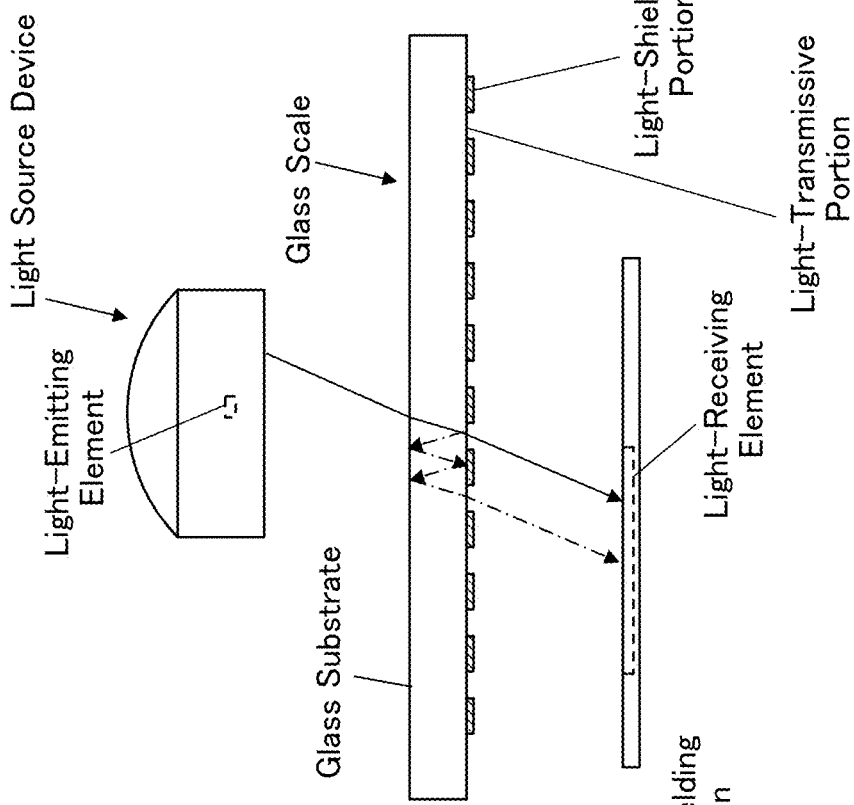
FIGS. 15A and 15B each show an illustrative view for describing a technical problem that exists in a glass scale of an optical encoder of the related art.
Figure 15B:
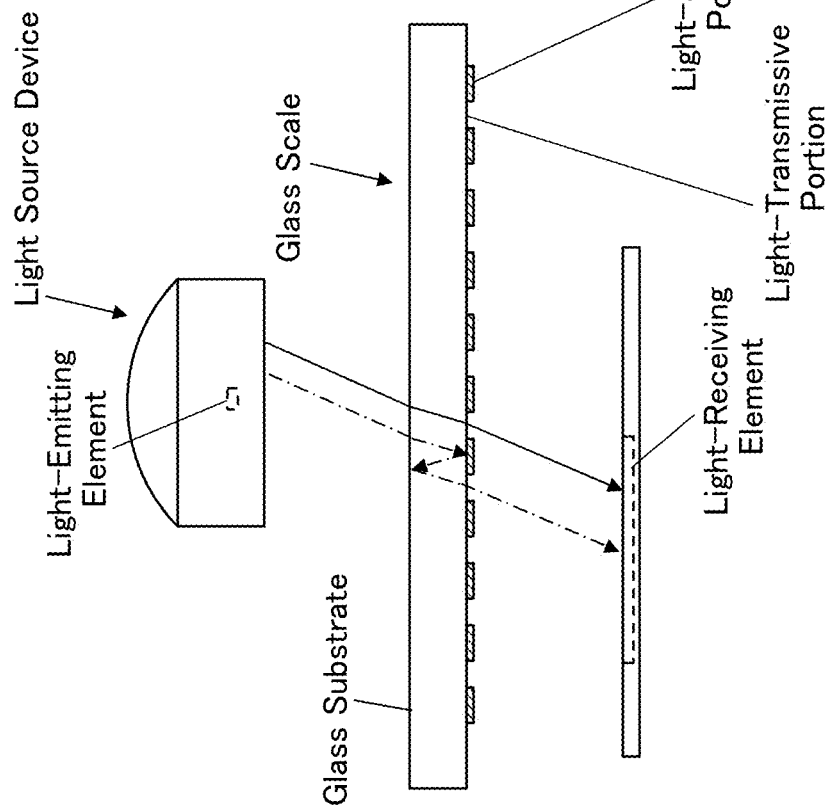

In an optical encoder using the above-described glass scale, in a state where parallel light rays irradiating at an incline relative to the light-receiving element or glass scale due to, e.g., the light source device being out of alignment, internal reflection of such light occurs at an inner surface of the glass substrate of the glass scale and sometimes externally escapes through transmissive portions through which such light is not supposed to pass (refer to the single-dot chain lines in FIGS. 15A and 15B). FIG. 15A shows an example of a reflection path that reflects back once within the glass substrate, and FIG. 15B shows an example of a reflection path that reflects back twice within the glass substrate. If such a phenomenon occurs, light unrelated to detection (stray light) becomes incident onto the light-receiving element, thereby generating detection signal noise, and becoming a cause for deterioration in the precision of positional detection.

In Patent Literature No. 3, in order to prevent light that is reflected by light-shielding portions (calibrations) of a glass scale from reflecting of a lead frame, etc., and becoming stray light, it is proposed to form the light-shielding portions with an anti-reflection member coated with CrO (chromium oxide) or a black coating, etc. Although such an anti-reflection member is effective in absorbing part of the incident light due to the anti-reflection member (coating) possessing absorbing properties, since there is a difference between the refractive index of the anti-reflection member (coating) and the refractive index of the glass substrate of the glass scale, occurrence of reflection light at the interfacial boundary between the anti-reflection member and the glass substrate cannot be prevented. Hence, suppression of stray light cannot be sufficiently carried out.

In the present disclosure, upon considering the above-discussed problems relating to Patent Literature No. 3 as an important technical challenge, the optical element is provided with a glass scale of an optical encoder, in which a plurality of colored layers forms a plurality of light-shielding surfaces (light-shielding portions) 20E of the glass scale. More specifically, in the present embodiment, as shown in FIGS. 16A and 16B, a plurality of colored layers extending from the surface of a glass substrate to the inside thereof are provided; the plurality of colored layers respectively forming the plurality of light-shielding surfaces 20E of the glass scale. Accordingly, likewise with the disclosure in Patent Literature No. 3, a light-shielding function, which is the original objective of the glass scale of the optical encoder, can be achieved. Furthermore, a plurality of light-transmissive surfaces (light-transmissive portions) 20F are provided between the light-shielding surfaces (light-shielding portions) 20E, respectively.

Furthermore, since the colored layers of the present disclosure possess a light absorbing function, light that is directly incident on the colored layers of the undersurface of the glass substrate are absorbed by the colored layers, and is thereby prevented from being incident on the light-receiving element (refer to the single-dot chain line in FIG. 16A). Whereas, light that is reflected by the light-transmissive surfaces of the undersurface of the glass substrate travels toward the upper surface of the glass surface to be reflected thereby and travel back toward the undersurface again; however, most of such light is absorbed by the colored layers formed at the undersurface and is prevented from being incident onto the light-receiving element (refer to the single-dot line in FIG. 16B).

Furthermore, there is almost no difference in the refractive index of the colored layers (light-shielding surfaces/light-shielding portions) of the present disclosure and the refractive index of the portion of the glass substrate that is not colored. Therefore, reflection light rays do not occur at the interfacial boundaries between the colored layers and the glass substrate, and since energy of the light incident on the colored layers is absorbed through the process of proceeding through the colored layers before reaching the interfacial boundary between the colored layers and air, almost no stray light occurs.

Although in the example discussed the pattern for the light-shielding surfaces is linear (having lines arranged in parallel), the shape and/or the widths of the light-shielding surfaces are not limited to those of the present embodiment (FIG. 16), and need only be appropriately determined for functioning as a code pattern. Furthermore, although the example discussed is for the case where the colored layers of the present embodiment are formed as light-shielding surfaces on a rectangular glass scale, the shape of the glass scale is not limited to a rectangular shape, and may be, e.g., a circular disk-shaped glass scale.

Accordingly, the optical function surface of the present disclosure is provided with a plurality of light-transmissive surfaces (light-transmissive portions) 20B, 20D and 20F, and a plurality of light-shielding surfaces (light-shielding portions) 20A, 20C and 20E, in which the respective light-transmissive surfaces (light-transmissive portions) are alternately and adjacently arranged with the respective light-shielding surfaces (light-shielding portions). Furthermore, the colored layers 20 of the present disclosure includes a plurality of colored layers that form the plurality of light-shielding surfaces (light-shielding portions) 20A, 20C and 20E. When colored layers are formed that satisfy such configurations, the optical element and optical apparatus can be applied to various other optical elements and optical apparatuses other than a parallax barrier, a zone plate and a glass scale of an optical encoder.

<Applying the Optical Element for Other Uses>

In addition to the examples described above, the optical element of the present disclosure may be used as at least one of a lens element, a flat parallel plate, a cover glass (e.g., a cover glass for an imaging sensor), an optical filter (e.g., IR cut filter, polarization filter, ND filter, etc.), a beam splitter, and a prism. In such a case, the colored layers can be positioned at the optical function surface of at least one of the lens element, the flat parallel plate, the cover glass, the optical filter, the beam splitter, and the prism.

INDUSTRIAL APPLICABILITY

The optical element and the optical apparatus of the present disclosure can be applied to, for example, a parallax barrier, a zone plate, and a glass scale of an optical encoder.

Obvious changes may be made in the specific examples/embodiments of the present invention described herein, such modifications being within the spirit and scope of the invention claimed. It is indicated that all matter contained herein is illustrative and does not limit the scope of the present invention.

What is claimed is:

1. An optical element including a glass body, the optical element comprising:
   a colored layer provided inside the glass body and positioned from an optical function surface of the glass body and extending inside the glass body, wherein:
   a thickness of the colored layer from the surface of the glass body and extending inside the glass body is 1 through 300 µm, and
   an optical density of the colored layer is 2.0 or more at a wavelength of 750 nm.

2. The optical element according to claim 1, wherein the optical function surface comprises a plurality of light-transmissive surfaces which are adjacently and alternately arranged with a plurality of light-shielding surfaces, wherein a plurality of the colored layers forms the plurality of light-shielding surfaces.

3. The optical element according to claim 2, wherein the optical element comprises a parallax barrier, and
   wherein the plurality of colored layers forms a plurality of light-shielding surfaces of the parallax barrier.

4. The optical element according to claim 2, wherein the optical element comprises a zone plate, and
   wherein the plurality of colored layers forms a plurality of light-shielding surfaces of the zone plate.

5. The optical element according to claim 2, wherein the optical element comprises a glass scale for an optical encoder, and
   wherein the plurality of color layers forms a plurality of light-shielding surfaces of the glass scale.

6. The optical element according to claim 1, wherein the optical element comprises at least one of a lens element, a flat parallel plate, a cover glass, an optical filter, a beam splitter, and a prism, and
   wherein the colored layer is provided at an optical function surface of the at least one of the lens element, the flat parallel plate, the cover glass, the optical filter, the beam splitter, and the prism.

7. An optical apparatus comprising the optical element of claim 1.

8. An optical element having a glass body, the optical element comprising:
   a colored layers provided inside the glass body and positioned at an optical function surface of the optical element, wherein the optical function surface comprises a plurality of light-transmissive surfaces which are adjacently and alternately arranged with a plurality of light-shielding surfaces; and
   a zone plate, wherein the plurality of colored layers forms the plurality of light-shielding surfaces of the plate.

* * * * *